(12) United States Patent
Nilsson et al.

(10) Patent No.: US 10,437,805 B2
(45) Date of Patent: Oct. 8, 2019

(54) METHODS AND SYSTEMS FOR DATA MANAGEMENT AND ANALYSIS

(71) Applicant: QlikTech International AB, Lund (SE)

(72) Inventors: Anders Nilsson, Lund (SE); Ingemar Carlo, Malmö (SE); José Diaz López, Lund (SE); Håkan Wolgé, Malmö (SE); Anders Helmer, Lund (SE); Thomas Lindén, Lund (SE)

(73) Assignee: QLIKTECH INTERNATIONAL AB, Lund (SE)

( * ) Notice: Subject to any disclaimer, the term of this patent is extended or adjusted under 35 U.S.C. 154(b) by 393 days.

(21) Appl. No.: 14/035,663

(22) Filed: Sep. 24, 2013

(65) Prior Publication Data
US 2015/0088902 A1    Mar. 26, 2015

(51) Int. Cl.
*G06F 17/30* (2006.01)
*G06F 16/22* (2019.01)
*G06F 16/245* (2019.01)

(52) U.S. Cl.
CPC ........ *G06F 16/2272* (2019.01); *G06F 16/245* (2019.01)

(58) Field of Classification Search
CPC ......... G06F 17/30324; G06F 17/30961; G06F 17/30964
See application file for complete search history.

(56) References Cited

U.S. PATENT DOCUMENTS

| | | | |
|---|---|---|---|
| 6,236,986 B1 * | 5/2001 | Gestrelius | G06F 16/24561 |
| 2006/0010114 A1 * | 1/2006 | Dumitru | G06F 16/283 |
| 2013/0166568 A1 * | 6/2013 | Binkert | G06F 17/30911 |
| | | | 707/741 |
| 2014/0280193 A1 * | 9/2014 | Cronin | G06F 17/30539 |
| | | | 707/741 |

* cited by examiner

*Primary Examiner* — Loc Tran
(74) *Attorney, Agent, or Firm* — Ballard Spahr LLP

(57) ABSTRACT

Provided are methods comprising receiving a query for information from the database, determining particular data element types and data element values that are the subject of the query, instantiating a query data structure containing the data element types and the data element values that are the subject of the query, identifying records within the database that contain one or more data element types and/or data element values that are included in the query data structure, and instantiating a results data structure comprising information relating to the identified records.

3 Claims, 26 Drawing Sheets

| Type | Engine | Transmission | Price | Make | Model |
|---|---|---|---|---|---|
| Coupe | 1.8 | Automatic | 19,000 | Honda | Civic |
| Coupe | 1.8 | Manual | 18,000 | Honda | Civic |
| Coupe | 2.4 | Manual | 23,000 | Honda | Accord |
| Coupe | 3.6 | Automatic | 23,000 | Chevrolet | Corvette |
| Coupe | 3.7 | Manual | 22,000 | Ford | Mustang |
| Hatchback | 1.6 | Manual | 14,000 | Ford | Fiesta |
| Hatchback | 1.8 | Automatic | 16,000 | Chevrolet | Sonic |
| Hatchback | 1.8 | Automatic | 20,000 | Toyota | Matrix |
| Hatchback | 1.8 | Automatic | 22,000 | Toyota | Prius |
| Hatchback | 2.0 | Manual | 20,000 | Ford | Focus |
| Sedan | 2.0 | Automatic | 25,000 | Chevrolet | Cruze |
| Sedan | 2.0 | Automatic | 30,000 | Ford | Fusion |
| Sedan | 2.4 | Manual | 23,000 | Honda | Accord |
| Sedan | 2.5 | Automatic | 22,000 | Ford | Fusion |
| Sedan | 2.5 | Automatic | 33,000 | Cadillac | ATS |
| Sedan | 3.5 | Automatic | 28,000 | Ford | Taurus |

| Type | Price | Make |
|---|---|---|
| Coupe | 14,000 | Cadillac |
| Hatchback | 16,000 | Chevrolet |
| Sedan | 18,000 | Ford |
| | 19,000 | Honda |
| Engine | 20,000 | Toyota |
| 1.6 | 22,000 | |
| 1.8 | 23,000 | Model |
| 2.0 | 25,000 | Accord |
| 2.4 | 28,000 | ATS |
| 2.5 | 30,000 | Civic |
| 3.5 | 33,000 | Corvette |
| 3.6 | | Cruze |
| 3.7 | | Fiesta |
| | | Focus |
| Transmission | | Fusion |
| Automatic | | Matrix |
| Manual | | Mustang |

FIG. 2c

| Type | Price | Make |
|---|---|---|
| Coupe | 18,000 | Chevrolet |
| | 19,000 | Ford |
| | 22,000 | Honda |
| | 23,000 | |

| Engine | | Model |
|---|---|---|
| 1.8 | | Accord |
| 2.4 | | Civic |
| 3.6 | | Corvette |
| 3.7 | | Mustang |

Transmission
Automatic
Manual

FIG. 4

Table 1

| Type | |
|---|---|
| Coupe | 0 |
| Hatchback | 1 |
| Sedan | 2 |

Table 2

| Engine | |
|---|---|
| 1.6 | 0 |
| 1.8 | 1 |
| 2.0 | 2 |
| 2.4 | 3 |
| 2.5 | 4 |
| 3.5 | 5 |
| 3.6 | 6 |
| 3.7 | 7 |

Table 3

| Transmission | |
|---|---|
| Automatic | 0 |
| Manual | 1 |

Table 4

| Make | |
|---|---|
| Cadillac | 0 |
| Chevrolet | 1 |
| Ford | 2 |
| Honda | 3 |
| Toyota | 4 |

Table 5

| Price | |
|---|---|
| 14,000 | 0 |
| 16,000 | 1 |
| 18,000 | 2 |
| 19,000 | 3 |
| 20,000 | 4 |
| 22,000 | 5 |
| 23,000 | 6 |
| 25,000 | 7 |
| 28,000 | 8 |
| 30,000 | 9 |
| 33,000 | 10 |

Table 6

| Model | |
|---|---|
| Accord | 0 |
| ATS | 1 |
| Corvette | 2 |
| Civic | 3 |
| Cruze | 4 |
| Fiesta | 5 |
| Focus | 6 |
| Fusion | 7 |
| Matrix | 8 |
| Mustang | 9 |
| Prius | 10 |
| Sonic | 11 |
| Taurus | 12 |

Table 7

| Data Element Types | |
|---|---|
| Engine | 0 |
| Make | 1 |
| Model | 2 |
| Price | 3 |
| Transmission | 4 |
| Type | 5 |

FIG. 5

Table 8

| Record | Type | Engine | Transmission | Price | Make | Model |
|--------|------|--------|--------------|-------|------|-------|
| 1 | 0 | 1 | 0 | 3 | 3 | 3 |
| 2 | 0 | 1 | 1 | 2 | 3 | 3 |
| 3 | 0 | 2 | 1 | 6 | 3 | 0 |
| 4 | 0 | 6 | 0 | 6 | 1 | 2 |
| 5 | 0 | 7 | 1 | 5 | 2 | 9 |
| 6 | 1 | 0 | 1 | 0 | 2 | 5 |
| 7 | 1 | 1 | 0 | 1 | 1 | 11 |
| 8 | 1 | 1 | 0 | 4 | 4 | 8 |
| 9 | 1 | 1 | 0 | 5 | 4 | 10 |
| 10 | 1 | 2 | 1 | 4 | 2 | 6 |
| 11 | 2 | 2 | 0 | 7 | 1 | 4 |
| 12 | 2 | 2 | 0 | 9 | 2 | 7 |
| 13 | 2 | 3 | 1 | 6 | 3 | 0 |
| 14 | 2 | 4 | 0 | 5 | 2 | 6 |
| 15 | 2 | 4 | 0 | 10 | 0 | 1 |
| 16 | 2 | 5 | 0 | 8 | 2 | 12 |

FIG. 6

| Type | Price | Make |
|---|---|---|
| Coupe | 18,000 | Honda |
| Hatchback | 19,000 | Chevrolet |
| Sedan | 23,000 | Ford |
| | 22,000 | Cadillac |
| Engine | 14,000 | Toyota |
| 1.8 | 16,000 | |
| 2.4 | 20,000 | Model |
| 3.6 | 25,000 | Accord |
| 3.7 | 28,000 | Civic |
| 1.6 | 30,000 | Corvette |
| 2.0 | 35,000 | Mustang |
| 2.5 | | ATS |
| 3.5 | | Cruze |
| | | Fiesta |
| Transmission | | Focus |
| Automatic | | Fusion |
| Manual | | Matrix |

FIG. 7

Type

| Coupe | 2 | 2 |
|---|---|---|
| Sedan | 0 | 1 |
| Hatchback | 0 | 0 |

Transmission

| Manual | 2 | 2 |
|---|---|---|
| Automatic | 1 | 2 |

Make

| Honda | 2 | 2 |
|---|---|---|
| Chevrolet | 0 | 1 |
| Ford | 0 | 1 |
| Cadillac | 0 | 0 |
| Toyota | 0 | 0 |

Engine

| 1.8 | 2 | 2 |
|---|---|---|
| 2.4 | 1 | 2 |
| 3.6 | 0 | 1 |
| 3.7 | 0 | 1 |
| 3.6 | 0 | 0 |
| 5.0 | 0 | 0 |
| 2.5 | 0 | 0 |
| 3.5 | 0 | 0 |

Price

| 18,000 | 1 | 2 |
|---|---|---|
| 19,000 | 1 | 2 |
| 23,000 | 1 | 2 |
| 22,000 | 0 | 1 |
| 14,000 | 0 | 0 |
| 16,000 | 0 | 0 |
| 20,000 | 0 | 0 |
| 25,000 | 0 | 0 |
| 28,000 | 0 | 0 |
| 30,000 | 0 | 0 |
| 33,000 | 0 | 0 |

Model

| Civic | 2 | 2 |
|---|---|---|
| Accord | 1 | 2 |
| Corvette | 0 | 1 |
| Mustang | 0 | 1 |
| ATS | 0 | 0 |
| Fiesta | 0 | 0 |
| Focus | 0 | 0 |
| Fusion | 0 | 0 |
| Matrix | 0 | 0 |
| Mustang | 0 | 0 |
| Prius | 0 | 0 |
| Sonic | 0 | 0 |
| Taurus | 0 | 0 |

FIG. 8

Type

| Coupe | 2 | Make,Type |
|---|---|---|
| Sedan | 1 | Make |
| Hatchback | 0 | |

Transmission

| Manual | 2 | Make,Type |
|---|---|---|
| Automatic | 2 | Make,Type |

Make

| Honda | 2 | Make,Type |
|---|---|---|
| Chevrolet | 1 | Type |
| Ford | 1 | Type |
| Cadillac | 0 | |
| Toyota | 0 | |

Engine

| 1.8 | 2 | Make,Type |
|---|---|---|
| 2.4 | 2 | Make,Type |
| 3.6 | 1 | Type |
| 3.7 | 1 | Type |
| 1.6 | 0 | |
| 2.0 | 0 | |
| 2.5 | 0 | |
| 3.5 | 0 | |

Price

| 18,000 | 2 | Make,Type |
|---|---|---|
| 19,000 | 2 | Make,Type |
| 23,000 | 2 | Make,Type |
| 22,000 | 1 | Type |
| 16,000 | 0 | |
| 16,000 | 0 | |
| 20,000 | 0 | |
| 25,000 | 0 | |
| 26,000 | 0 | |
| 40,000 | 0 | |
| 35,000 | 0 | |

Model

| Civic | 2 | Make,Type |
|---|---|---|
| Accord | 2 | Make,Type |
| Corvette | 1 | Type |
| Mustang | 1 | Type |
| ATS | 0 | |
| Fiesta | 0 | |
| Focus | 0 | |
| Fusion | 0 | |
| Metric | 0 | |
| Mustang | 0 | |
| Prius | 0 | |
| Sonic | 0 | |
| Taurus | 0 | |

FIG. 9

Type

| Coupe | 3 | Make,Type,Trans. |
|---|---|---|
| Sedan | 2 | Make,Trans. |
| Hatchback | 1 | Trans. |

Transmission

| Manual | 3 | Make,Type,Trans. |
|---|---|---|
| Automatic | 2 | Make,Type |

Make

| Honda | 3 | Make,Type,Trans. |
|---|---|---|
| Ford | 2 | Type, Trans. |
| Chevrolet | 1 | Type |
| Cadillac | 0 | |
| Toyota | 0 | |

Engine

| 1.8 | 3 | Make,Type,Trans. |
|---|---|---|
| 2.4 | 3 | Make,Type,Trans. |
| 3.7 | 2 | Type,Trans. |
| 3.6 | 1 | Type |
| 1.6 | 1 | Trans. |
| 2.0 | 1 | Trans. |
| 2.5 | 0 | |
| 3.5 | 0 | |

Price

| 18,000 | 3 | Make,Type,Trans. |
|---|---|---|
| 23,000 | 3 | Make,Type,Trans. |
| 19,000 | 2 | Make,Type |
| 22,000 | 2 | Type, Trans. |
| 14,000 | 1 | Trans. |
| 20,000 | 1 | Trans. |
| 16,000 | 0 | |
| 25,000 | 0 | |
| 28,000 | 0 | |
| 30,000 | 0 | |
| 35,000 | 0 | |

Model

| Civic | 3 | Make,Type,Trans. |
|---|---|---|
| Accord | 3 | Make,Type,Trans. |
| Mustang | 2 | Type,Trans. |
| Corvette | 1 | Type |
| Fiesta | 1 | Trans. |
| Focus | 1 | Trans. |
| ATS | 0 | |
| Camry | 0 | |
| Matrix | 0 | |
| Mustang | 0 | |
| Prius | 0 | |
| Sonic | 0 | |
| Taurus | 0 | |

METHODS AND SYSTEMS FOR DATA MANAGEMENT AND ANALYSIS

BACKGROUND

The ability to obtain and analyze pertinent information from large databases is a critical element in understanding what is happening in a business. Businesses are collecting more and more data as their operations increase in size and complexity. Identifying and locating relevant data in these voluminous databases continues to be a significant challenge that is made substantially more complex and difficult as the sizes and complexities of the databases have grown. This process, as well as the process of analyzing and visualizing the relevant data, are computationally and time intensive.

Data analysis or analytics is a process of inspecting, cleaning, transforming, modeling and presenting the data with the goal of highlighting useful information, suggesting conclusions, and supporting decision making. As part of this process it is often useful to take what is referred to as a "snapshot" of a data presentation. The term was coined as an analogy to the same term as used in photography, and like its photographic counterpart, a data snapshot is a static representation of certain elements at the particular point in time and state that the snapshot was taken. Such elements as are included in a data snapshot may include the results of applying various queries or other processing of the underlying data.

While database snapshots and the techniques therefor are known to those skilled in the database art, they currently have several limitations. Snapshots are static and reflect the data and/or the visualization of the data at a particular state and point in time. Snapshots can be created, stored, and called upon as needed, but when called upon, the snapshots produce only the same data or data display that was originally captured. Snapshots cannot readily be altered or re-configured as desired, except for adding text and graphics to help understand the data and reports that have been captured, but not for changing the data or the reports. Additionally, there are often specific configuration requirements, pre-conditions, and pre-configurations which must met before a snapshot can be taken. These and other limitations and restrictions are known to those skilled in the database art.

SUMMARY

Provided herein are methods and systems for data management and analysis. The methods and systems described, in one aspect, can facilitate the analysis of information to provide usable output for various users of a database.

In an aspect, provided are methods for analyzing information within a database that comprises one or more database structures which collectively contain a plurality of data records, with each record having at least two data element types, and with at least one of the data element types having a different data element value from the data element value for the corresponding data element type in at least one other record in the database; the method characterized by the steps of reading the plurality of records, instantiating an initial data structure for each unique data element type within the plurality of records, creating an entry in the initial data structure for each data element type for each unique data element value within that data element type, selecting one or more database structures within the database, instantiating a final data structure for the selected database structures in which the data element value for each data element type reflects the entry made in the initial data structures for that data element value.

In another aspect, provided are methods comprising receiving a query for information from the database, determining particular data element types and data element values that are the subject of the query, instantiating a query data structure containing the data element types and the data element values that are the subject of the query, identifying records within the database that contain one or more data element types and/or data element values that are included in the query data structure, and instantiating a results data structure comprising information relating to the identified records.

In a further aspect, provided are methods for analyzing information, comprising identifying, in a database, unique data element types, generating a plurality of initial data structures corresponding to the unique data element types, wherein the plurality of initial data structures comprise unique data elements associated with the corresponding unique data element type, generating a final data structure based on the plurality of initial data structures, wherein the final data structure is a non-redundant combination of the plurality of initial data structures, and providing search results relevant to a search query based on the final data structure.

In another aspect, provided are methods, comprising receiving a query for information from a database, identifying data element types relevant to the query and data element values relevant to the query, generating a query structure based on the identified data element types and data element values, identifying a data structure relevant to the query structure, wherein the data structure comprises non-redundant data element values from the database, identifying records in the data structure based on the query structure, and providing the records in response to the query for information.

It is an object of one or more embodiments of the present disclosure to provide a means for easily capturing dynamic presentations or visualizations of data that are determined to be beneficial. It is an object of one or more embodiments of the present disclosure to provide a means for affording easy the communication and use of such captured dynamic presentations or visualizations. It is an object of one or more embodiments of the present disclosure to provide a means for affording easy access to, and modification of, previously captured dynamic presentations or visualizations. It is an object of one or more embodiments of the present disclosure to provide a means for affording alternative analysis of such captured presentations or visualization while preserving or curating the underlying data that comprises the captured presentations or visualizations. It is an object of one or more embodiments of the present disclosure to provide a means for easily updating all or a portion of the data contained within the captured presentations or visualizations without changing the specifications for the captured presentations or visualizations.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive or limiting, as presented herein.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 2a illustrates an exemplary database and visualizations thereof;

FIG. 2b illustrates an exemplary database and visualizations thereof;

FIG. 2c illustrates an exemplary database and visualizations thereof;

FIG. 4 illustrates various intermediate data structures for an embodiment of the present disclosure;

FIG. 5 illustrates a final data structure for an embodiment of the present disclosure; and FIG. 6 illustrates a visualization of the final data structure for an embodiment of the present disclosure;

FIG. 7 illustrates a data display as a result of a counting operation;

FIG. 8 illustrates another data display as a result of a counting operation;

FIG. 9 illustrates selections in a data display;

FIG. 12b illustrates a modification of the auto-complete operation of FIG. 12a;

DETAILED DESCRIPTION

Figure 1:
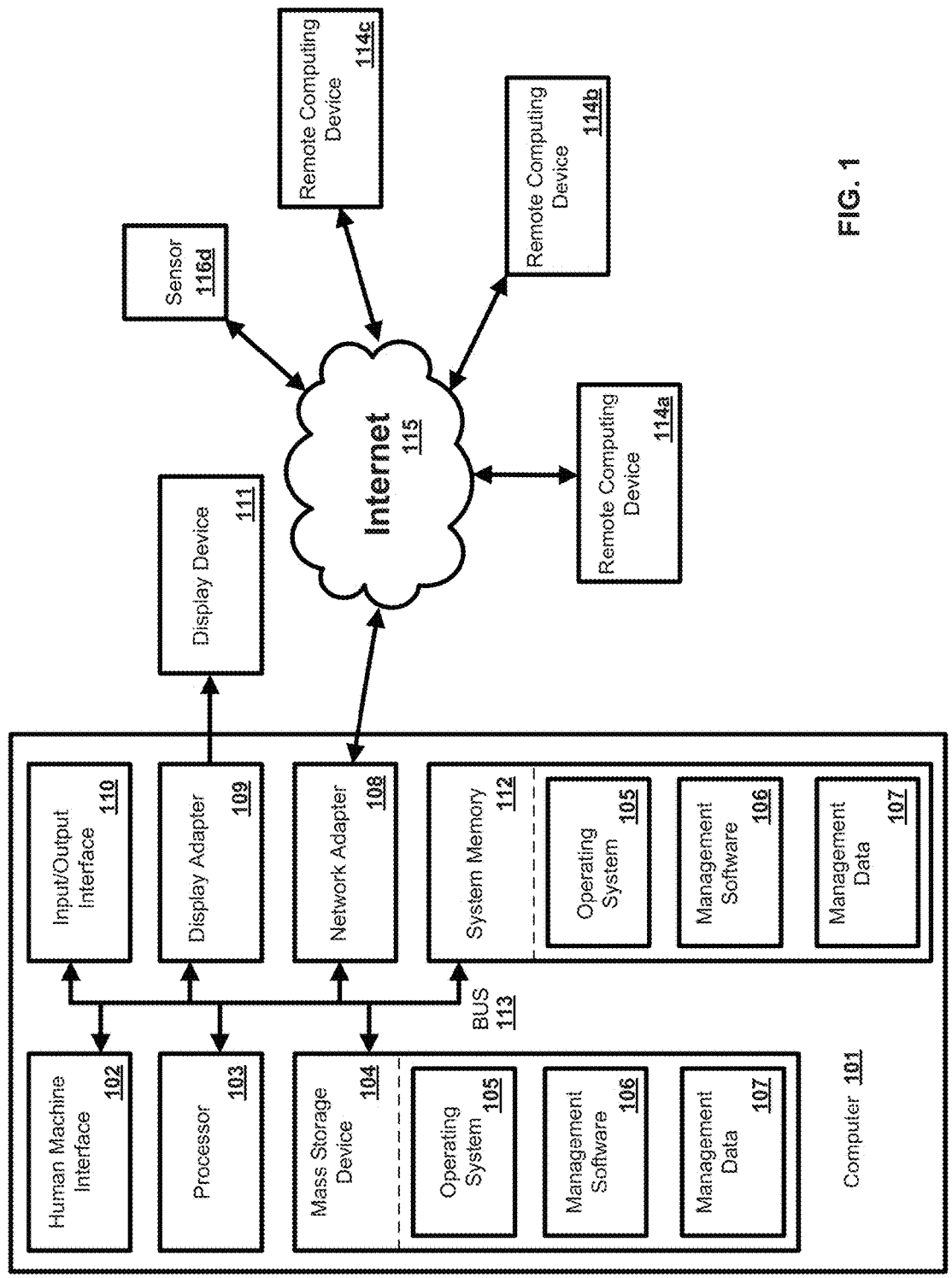
FIG. 1 is an exemplary computing system.

Before the present methods and systems are disclosed and described in more detail, it is to be understood that the methods and systems are not limited to specific steps, processes, components, or structure described, or to the order or particular combination of such steps or components as described. It is also to be understood that the terminology used herein is for the purpose of describing exemplary embodiments only and is not intended to be restrictive or limiting.

As used herein the singular forms "a," "an," and "the" include both singular and plural referents unless the context clearly dictates otherwise. Values expressed as approximations, by use of antecedents such as "about" or "approximately," shall include reasonable variations from the referenced values. If such approximate values are included with ranges, not only are the endpoints considered approximations, the magnitude of the range shall also be considered an approximation. Lists are to be considered exemplary and not restricted or limited to the elements comprising the list or to the order in which the elements have been listed unless the context clearly dictates otherwise.

Throughout the specification and claims of this disclosure, the following words have the meaning that is set forth: "Comprise" and variations of the word, such as "comprising" and "comprises," mean including but not limited to, and are not intended to exclude, for example, other additives, components, integers or steps. "Exemplary" means "an example of", but not essential, necessary, or restricted or limited to, nor does it convey an indication of a preferred or ideal embodiment. "Include" and variations of the word, such as "including" are not intended to mean something that is restricted or limited to what is indicated as being included, or to exclude what is not indicated. "May" means something that is permissive but not restrictive or limiting. "Optional" or "optionally" means something that may or may not be included without changing the result or what is being described. "Prefer" and variations of the word such as "preferred" or "preferably" mean something that is exemplary and more ideal, but not required. "Such as" means something that is exemplary.

Steps and components described herein as being used to perform the disclosed methods and construct the disclosed systems are exemplary unless the context clearly dictates otherwise. It is to be understood that when combinations, subsets, interactions, groups, etc. of these steps and components are disclosed, that while specific reference of each various individual and collective combinations and permutation of these may not be explicitly disclosed, each is specifically contemplated and described herein, for all methods and systems. This applies to all aspects of this application including, but not limited to, steps in disclosed methods and/or the components disclosed in the systems. Thus, if there are a variety of additional steps that can be performed or components that can be added, it is understood that each of these additional steps can be performed and components added with any specific embodiment or combination of embodiments of the disclosed systems and methods.

The present methods and systems may be understood more readily by reference to the following detailed description of preferred embodiments and the Examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices, whether internal, networked or cloud based.

Embodiments of the methods and systems are described below with reference to diagrams, flowcharts and other illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions FIG. 1 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, structures, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 101 such as is illustrated in FIG. 1. The components of the computer 101 can comprise, but are not limited to, one or more processors or processing units 103, a system memory 112, and a system bus 113 that couples various system components including the processor 103 to the system memory 112. In the case of multiple processing units 103, the system can utilize parallel computing.

The system bus 113 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 113, and all buses specified in this description can also be implemented over a wired or wireless network connection and each of the subsystems, including the processor 103, a mass storage device 104, an operating system 105, management software 106, management data 107, a network adapter 108, system memory 112, an Input/Output Interface 110, a display adapter 109, a display device 111, and a human machine interface 102, can be contained within one or more remote computing devices 114*a,b,c* at physically separate locations, connected through buses of this form, in effect implementing a fully distributed system.

The computer 101 typically comprises a variety of computer readable media. Exemplary readable media can be any available media that is accessible by the computer 101 and comprises, for example and not meant to be limiting, both volatile and non-volatile media, removable and non-removable media. The system memory 112 comprises computer readable media in the form of volatile memory, such as random access memory (RAM), and/or non-volatile memory, such as read only memory (ROM). The system memory 112 typically contains data such as management data 107 and/or program modules such as operating system 105 and management software 106 that are immediately accessible to and/or are presently operated on by the processing unit 103.

Figure 11:
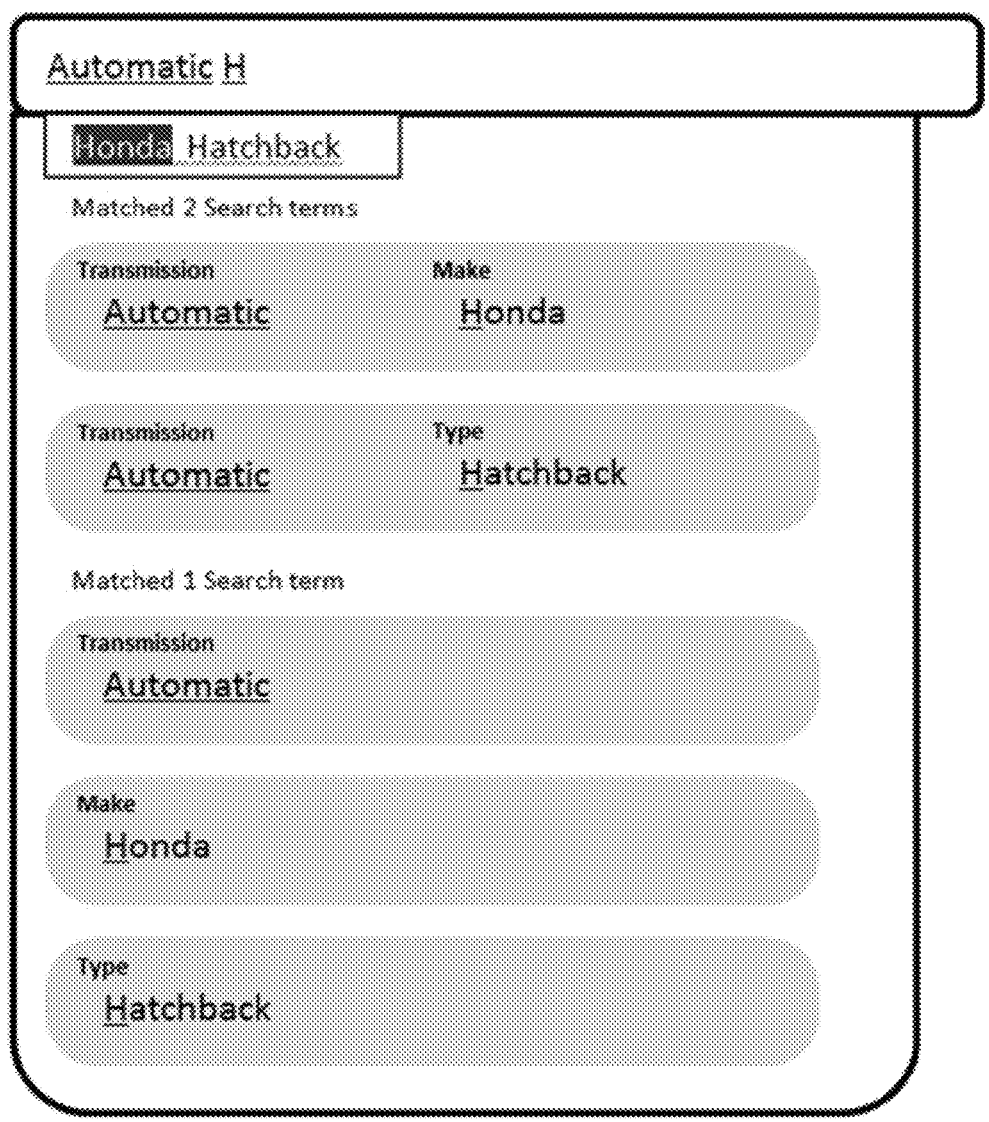
FIG. 11 illustrates yet another exemplary auto-complete operation.

In another aspect, the computer 101 can also comprise other removable/non-removable, volatile/non-volatile computer storage media. By way of example, FIG. 11 illustrates a mass storage device 104 which can provide non-volatile storage of computer code, computer readable instructions, data structures, program modules, and other data for the computer 101. For example and not meant to be limiting, a mass storage device 104 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 104, including by way of example, an operating system 105 and management software 106. Each of the operating system 105 and management software 106 (or some combination thereof) can comprise elements of the programming and the management software 106. Management data 107 can also be stored on the mass storage device 104. Management data 107 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 101 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 103 via a human machine interface 102 that is coupled to the system bus 113, but can be connected by other interface and bus structures, such as a parallel port, game port, an IEEE 1394 Port (also known as a Firewire port), a serial port, or a universal serial bus (USB).

In yet another aspect, a display device 111 can also be connected to the system bus 113 via an interface, such as a display adapter 109. It is contemplated that the computer 101 can have more than one display adapter 109 and the computer 101 can have more than one display device 111. For example, a display device can be a monitor, an LCD (Liquid Crystal Display), or a projector. In addition to the display device 111, other output peripheral devices can comprise components such as speakers (not shown) and a printer (not shown) which can be connected to the computer 101 via Input/Output Interface 110. Any step and/or result of the methods can be output in any form to an output device. Such output can be any form of visual representation, including, but not limited to, textual, graphical, animation, audio, tactile, and the like.

The computer 101 can operate in a networked environment using logical connections to one or more remote computing devices 114*a,b,c*. By way of example, a remote computing device can be a personal computer, portable computer, a server, a router, a network computer, a peer device or other common network node, and so on. Logical connections between the computer 101 and a remote computing device 114*a,b,c* can be made via a local area network (LAN) and a general wide area network (WAN). Such network connections can be through a network adapter 108. A network adapter 108 can be implemented in both wired and wireless environments. Such networking environments are conventional and commonplace in offices, enterprise-wide computer networks, intranets, and the Internet 115.

For purposes of illustration, application programs and other executable program components such as the operating system 105 are illustrated herein as discrete blocks, although it is recognized that such programs and components reside at various times in different storage components of the computing device 101, and are executed by the data processor(s) of the computer. An implementation of management software 106 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

An example of a database 200 is illustrated in FIG. 2*a*. This database comprises a single database structure, e.g., a table, containing a plurality of records having multiple data elements. Each of the data elements has a data element type and a data element value (for example "Make" is the data element type and "Honda" is the data element value). The database can comprise at least some records in which the data element values are different from those in other records and some in which the values are the same or "null". Although FIG. 2*a* illustrates a single table, the multiple records may be stored in other database structures such as data cubes, data arrays, data strings, flat files, lists, vectors, and so forth; and the number of database structures may be greater than just one and may consist of multiple types and combinations of database structures. While these and other database structures can be used with, and as part of, the methods and systems disclosed, the remaining description will refer to tables, vectors, strings and data cubes solely for convenience. Additional database structures can be included within the database illustrated as an example herein, with such structures including additional information pertinent to the database such as, in the case of vehicles for example; color, optional packages, etc. Each table can comprise a header row 201 which can identify the various data element types, often referred to as the dimensions or the fields, that are included within the table. Each table can also have one or more additional rows 202 which comprise the various records making up the table. Each of the rows would contain data element values 203 (including null) for the various data element types comprising the record.

Related data element types may exist among the tables, for example the database may contain two or more tables, each having "Transmission" as a data element type. This can be done to place top level information in a single table and then to use common data element fields to link that top level table to other dependent tables to provide more detailed information in these dependent tables. The common or related data element types can serve as keys to link or associate the tables and thereby provide further detail regarding the subject matter of the data element types. For example, with the data element type "Transmission" there may be a dependent table for the data element value "Manual," indicating additional information like "4-Speed" or "5-Speed." Although the use of common data element types can provide automatic linkage, techniques can be used to specify a linkage, in which event the use of common data element types is not required.

Techniques for performing an analysis to determine the relationships between the various tables, and to virtually connect tables that are dependent through their linkage can be used. If two tables have more than one variable in common a "loop" is created, and techniques can be used to resolve such loops and thereby simplify the dependencies. In this manner the relationships between the various data element types comprising the database can be determined. It should be noted that, in addition to relationships between the various tables comprising the database, there is also an implicit link or association between each of the data element types comprising a single row or record within a table.

Once all the dependencies between the various tables or other database structures are known, it is possible to display, in a simplified format, the relationships among the various data element types and data element values included within the database, for example, to create list boxes or other data display objects to list the unique data element values for each relevant data element type. To assist in this process, conversion structures can be used to resolve dependencies, for example, to add the more specific entries, such as 4-speed or 5-speed, for "Manual" to the data element type "Transmission." An example of list boxes displaying the unique data element values for selected fields or data element types in the database (in which the dependencies have been removed) is illustrated in FIG. 2b.

The database can be queried by specifying the data element types and data element values of interest and by further specifying any functions to apply to the data contained within the specified data element types of the database. The functions which can be used within a query can include, for example, expressions using statistics, sub-queries, filters, mathematical formulas, and the like, to help the user to locate and/or calculate the specific information wanted from the database. Once located and/or calculated, the results of a query can be displayed to the user with various visualization techniques and objects such as the list boxes illustrated in FIG. 2c.

The result of a standard query is typically a smaller subset of the data within the database, or a result set, which is comprised of the records, and more specifically, the data element types and data element values within those records, along with any calculated functions, that match the specified query. For instance, as indicated in FIG. 2c, the data element value "Coupe" can be specified as a query or filtering criteria (this is indicated by the highlighting in FIG. 2c) and the resulting data element values that are displayed in the list boxes for the included data element types are now only those which apply to the data element value "Coupe." Referring back to FIG. 2a, note that there are only 5 records with a data element value of "Coupe," and that the query has eliminated all records not having that data element value. This is evidenced by comparing FIG. 2b to FIG. 2c. The present methods and systems overcome these limitations of the current database technology.

Figure 3A:
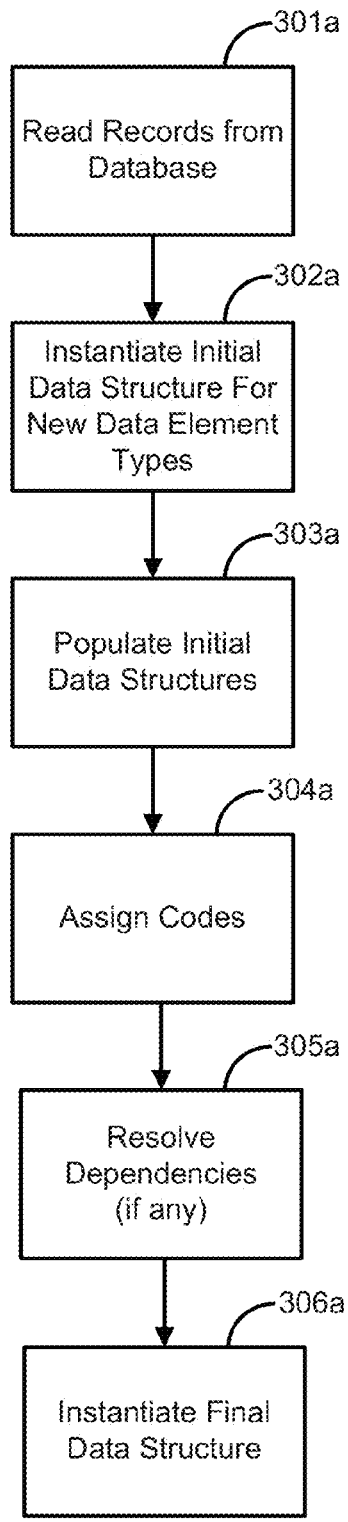
FIG. 3a illustrates the steps of a method according to one embodiment of the present disclosure.

In an aspect of the present disclosure, illustrated in FIG. 3a, one or more of the records in one or more of the data structures comprising the database can be read at 301a, for example, by using a SELECT statement which selects applicable database tables and the selected records. Typically the records can be read into the system memory 112 of the computer 101, although the records can also be read into external memory (for example, cloud storage). Accordingly, for one or more tables in the database, a computer can carry out one or more of the following steps in any order. The field names, e.g. the data element types 201, of the table can be successively read. In an aspect, when a new data element type is encountered, an initial data structure can be instantiated (e.g., created, displayed, etc. . . . ) for the new data element type at 302a. Data records (or remaining rows of the tables) (such as records 202) can be read and such data element values (such as data element values 203) from the records can be entered (e.g., populated, etc. . . . ) into the applicable initial data structure for the corresponding data element type at 303a. In an aspect, for each data element value, the data structure of the corresponding data element type can be checked to establish if that value has previously been entered. If so, it will not be re-entered, such that the initial data structure for each data element type will only contain the unique data element values for that data element type, but will not repeat non-unique data element values. The result of performing these steps affords a display of the resultant data such as that illustrated in FIG. 4. Each of these initial data structures can then be associated with a unique identifier (such as a hash function) and the resulting information can be stored in memory.

In a further aspect, at 304a, one or more of the unique data element types and one or more of the unique data element values within a data element type can be assigned a code (for example, a binary code) that can be stored in the computer memory and easily processed by the computer, and that can be used instead of the actual alpha-numeric values for the data element values when processing the database. For example, for each data element value of each data element type, the methods and systems can assign a binary code, using the same binary code for each data element value which is the same, and a different binary code for each data element which is different. For each unique data element value, the methods and systems can create an entry that includes the assigned binary codes in the initial data structure for that data element type.

However, the methods and systems do not require binary coding. The code which is assigned can be a code that can also be sorted such as a numeric or alphabetic code. The ability to sort the values can enable displaying the values as part of a visualization of the data or when performing various functions like identifying minimum and maximum values. The assignment of a binary code can be performed when data records are first read from the database. Accordingly, the assigned binary code for each unique data element value and each unique data element type can be inserted in the corresponding initial data structure for that data element type and for the associated data element values for that data element type. If the data element type or the data element value is new it can be assigned a new binary code (for example, the next binary code in ascending order) before being inserted in the data structure. In other words, for each unique data element type, a unique binary code can be assigned to that data element type and to each unique data element value associated with that data element type. FIG. 4 illustrates exemplary initial data structures that can be instantiated for various data element types along with the exemplary binary codes that can be been assigned to different data element values and the data element types that are included in the database of FIG. 2. For ease of understanding, alpha-numeric headers have been added to the various initial data structures.

Reference is now made to U.S. Pat. No. 8,244,741 B2, which is assigned to the same Assignee as the present application, and the teachings of which are incorporated herein by reference, wherein the process of associating a hash function with the relevant data structures and storing in memory the hash function along with the applicable database information contained in the structures, is described.

In an embodiment of the present disclosure, the methods and systems provided can instantiate a data structure, as illustrated in FIG. 4 (Table 7), that contains the unique data element types within the subject database. Such initial data structure facilitates locating and utilizing other initial data structures (Tables 1-6) for each of the unique data element types. This initial data structure can also be associated with a unique identifier (such as a hash function) and the resulting information stored in memory. As used herein, "initial" does not require that the initial data structures be the first data structures created as part of the methods and systems disclosed. Other data structures can be created prior to, and after, the initial data structures.

Returning to FIG. 3a, at step 305a, the methods and systems can determine if the database contains one or multiple database structures and if so, determine, identify, and resolve the dependencies between the database structures. In an aspect, the methods and systems can instantiate one or more final data structures that can fully represent the database at 306a, with all dependencies removed; and again these final data structure(s) can be associated with a unique database identifier or hash function, and the resultant information stored in memory. In an aspect, the methods and systems can instantiate a final data structure in which the data element values for each data record in that database object are replaced by the assigned binary code for that data element value. In a further aspect, at step 306a, for one or more database objects which are dependent, the methods and systems can create a conversion structure that can resolve such dependencies using the assigned binary codes for the data element values, and can use such conversion structures to create a final data structure for such dependent database objects. As used, herein, "final" does not indicate that further processing is foreclosed, or that that the final data structure is the last data structure created.

Using Tables 1-7 it is possible to create the referenced final data structure(s) which reflect various records contained within the database. Table 8 of FIG. 5 illustrates such a final data structure in which the assigned binary codes for the various data element values have been substituted for the actual alpha-numeric values. In addition to facilitating the processing of the database, Tables 1-7 can also be used as "look-up" tables to convert between the actual alpha-numeric values of the data element values and the assigned binary values corresponding to their alpha-numeric counterpart.

It is one aspect of the present disclosure that the above processes need only be completed once each time a database is loaded or reloaded, and the appropriate interim and final data structures can be created and stored in memory along with their associated identifier. These processes need not be repeated when queries are entered or changed, or when visualizations are entered or changed. However, the processes can be completed at any point in the life of a database.

Figure 3B:
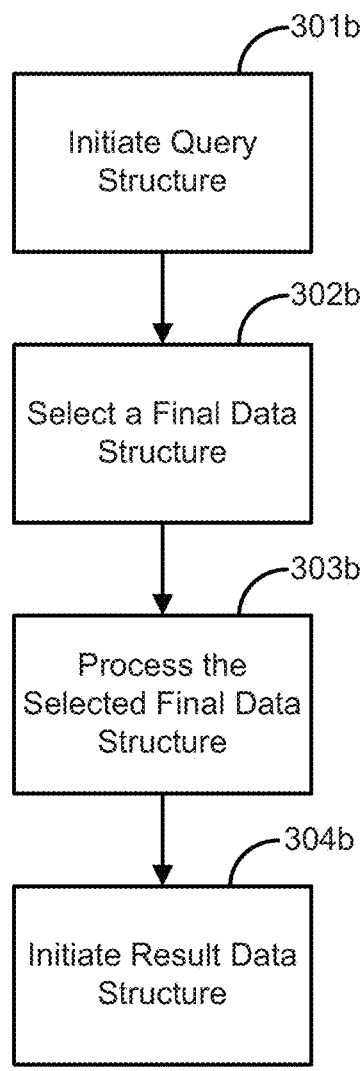
FIG. 3b illustrates the steps of a method according to one embodiment of the present disclosure.

In an aspect, illustrated in FIG. 3b, provided are methods and systems for query handling. If a query is made to analyze and/or interpret data within the database, the information stored through the above processes, as illustrated in Tables 1-8 can be used to process both the data element types and data element values that are the subject of the query. Upon receiving a query to the database, the methods and systems can determine the particular data element types and functions that are applicable to the query as well as the data element types that are applicable to the functions and can initiate a query data structure containing this information at 301b.

To facilitate this processing the data element types and data element values of the query, the query itself can be converted to use the assigned binary codes as determined in step 304a of FIG. 3a. For example, if it is desired to find within this database all vehicles having the Type—"Coupe," and the Make—"Honda." The binary code for Coupe is "0" and the binary code for Honda is "3." These values, along with any functions required to be calculated as part of the query, can be stored in a query data structure such as a vector, data string, data array, table, and the like, that can be processed with the final data structure, in this case, Table 8 of FIG. 5, to execute the query and yield the query results. It should also be noted that if the query criteria involve functions which require calculations, an initial data structure can be instantiated for each of the functions which can be filled with the results of the functions as they are calculated. Again, the results of a query can be inserted and associated with a unique binary code assigned in the same manner as used with data element values. In an aspect, the data structures comprising the query can also be associated with a unique identifier (e.g., a hash function) and the resulting information stored in memory. This process can occur for each new query (including modifications of an existing query.) Thus, given adequate memory, all queries that have been made to the database can be stored, and such queries can be reutilized without the need for significant incremental processing. It should be noted that by using the instantiated data structures and the assigned binary codes instead of the actual alpha-numeric values, the required memory and processing time are substantially reduced.

The results obtained from a query, including the results of calculated functions specified within the query, can be included in a data structure associated with the data structure for that query. The resulting information can be stored in memory along with an associated unique identifier that can be used to retrieve the already processed result set whenever the query that yielded that result set needs to be re-executed. This results in a substantial savings in time and processing.

The data element types that are the subject of query can be referred to as classification element types and the data element types that are the subject of a function of filtering criteria can be referred to as function element types. These classification and function element types can be used to select a final data structure that contains the greatest number of these included element types at 302b. The final data structure selected can be referred to as a starting table. In the illustrated database there is only one final data structure and so this selection is simple. Databases with multiple final data structures can be processed in the same manner. If there are multiple final data structures having comparable element types, the starting table can be selected by using the final data structure having the most records.

The starting table can be processed using the query data structure to identify records in the database containing the data element types and the data element values which are the subject matter of the query at 303b. In an aspect, the methods and systems can identify records that contain data element values that are included within the query data structure. The methods and systems can initiate a result data structure and store within the result data structure information relating to the identified records at 304b. The result data structure can be instantiated to store the results of the processing, which can include results data structure information relating to the identified records. This information can be stored using the assigned identifier. Such information can include the applicable record number(s), the data element types and data element values, and the calculated functions matching elements of the query (or query data structure) as well as the records, data element types and data element values, and the calculated functions that match less than all or none of the elements of the query.

Reference is now made to U.S. Pat. No. 6,236,986 B1 and hereinafter "the '986 Patent" which is assigned to the same Assignee as the current application, and the teachings of which are incorporated herein by reference. This patent teaches the use of selection, status and frequency data strings, arrays, vectors and other data structures. For simplicity, future references to these structures will use the terms vector, strings and cubes even though other data structures should also be considered as being usable with the present methods and systems. Utilizing the data structures referenced above (including the sort order for the referenced data element values therein) selection, status and frequency vectors can be instantiated for the various data element types, data element values and calculated results.

data element type, which can also have a number of positions equal to the number of unique data element values, and single bit with a value equal to "1" in all positions, indicating that all selections are possible. The frequency vector can also be instantiated, having a like number of positions, which can all initially be set to "0" values since no queries have been processed and no results have been counted. This information can be used to easily present the data to the user that is contained within the final data structures, for example, using list boxes such as those illustrated in FIG. 6, with all data element values for all data element types being displayed since, as reflected by the vectors displayed in Table 8a, no queries or selections have been made, resulting in the initial status vectors having a "1" in all positions and the initial frequency and selection vectors having a "0" in all positions.

TABLE 8a

Initial Selection, Status and Frequency Vectors

| Vectors | Type | Engine | Transmission | Price | Make | Model |
|---|---|---|---|---|---|---|
| Selection | 0, 0, 0 | 0, 0, 0, 0, 0, 0, 0, 0 | 0, 0 | 0, 0, 0, 0, 0, 0, 0, 0, 0, 0, 0 | 0, 0, 0, 0, 0 | 0, 0, 0, 0, 0, 0, 0, 0, 0, 0, 0, 0 |
| Status | 1, 1, 1 | 1, 1, 1, 1, 1, 1, 1, 1 | 1, 1 | 1, 1, 1, 1, 1, 1, 1, 1, 1, 1, 1 | 1, 1, 1, 1, 1 | 1, 1, 1, 1, 1, 1, 1, 1, 1, 1, 1, 1 |
| Frequency | 0, 0, 0 | 0, 0, 0, 0, 0, 0, 0, 0 | 0, 0 | 0, 0, 0, 0, 0, 0, 0, 0, 0, 0, 0 | 0, 0, 0, 0, 0 | 0, 0, 0, 0, 0, 0, 0, 0, 0, 0, 0, 0 |

In an aspect, the vectors described in the '986 Patent for the various data element types can be a numeric string having one position for each unique data element value of that data element type. Accordingly, such string will have a total number of positions equal to the number of unique data element values in that data element type. Each of the unique data element values for a data element type can be assigned a unique value that represents that particular data element value for that data element type. For example, if there are eight unique data element values for a particular data element type, each data element value can be assigned a number between "0" and "7," or "1" and "8," or "000" and "111," etc., depending upon the convention or system utilized, and any convention or system can be used according to the teachings of the present disclosure. It is possible to process (through Boolean calculations and otherwise) these vectors regardless of the numbering system or convention used, and conversions can be made between the various systems and conventions. In the case of the frequency vector, which is typically a counting vector, the values which are assigned will reflect the number of occurrences of the particular data element value associated with that vector. It should be noted that different embodiments of the present methods and systems can use different combinations of the vectors described in the '986 Patent or can use them for different purposes as will be described below.

As illustrated in Table 8a, below, an aspect of the present methods and systems can instantiate an initial selection vector for each unique data element type in the data structures, with a number of positions equal to the number of unique data element values for that data element type, and a single bit in each position, having a value equal to "0", indicating that no query has been entered or received, and no selections have been made for that data element type. Similarly the initial status vector can be instantiated for each When a query is made, for example, for all vehicles having the Type—"Coupe," the above selection vectors can be updated to reflect the query. The selection vector for the "Type" data element type becomes 1,0,0; indicating that "Coupe" has been selected (and Hatchback and Sedan were not selected). This is the same as entering "True" for the data element value "Coupe" and a "False" for all other possible element values for that data element type. It should be understood that selections can be made in more than one field or data element type, and if this is the case the selection vector for that data element type would be updated to include a "1" for the selected data element value, and a "0" for the rest of the data element values. Thus if "Honda" is also selected, the resulting selection vector for the data element type "Make" will be 0,0,0,1,0. Similarly more than one data element value can be selected within a data element type, and if this is the case then the selected values will still be represented by a "1" and the non-selected values will be represented by a "0." The updated selection vectors associated with the selection of "Coupe" and "Honda" are illustrated in Table 8b. It should also be understood that the selection vectors would be updated and processed with every new selection or modification of a selection. With respect to the current example in which two selections have been made, there will be two updates to the selection vector and that vector will be processed two times as further described below.

The updated selection vector can then used to update the status vector, accordingly with this embodiment, the status vector can be updated to reflect the selection of both "Coupe" and "Honda". Basically the updated selection vector can be copied into the status vector to create the updated status vector for each data element type. The updated status vector reflecting the selection of Coupe and Honda is illustrated in Table 8b.

TABLE 8b

Selection, Status and Frequency Vectors for the various data element types after receipt of Query selecting both Coupe and Honda

| Vectors | Type | Engine | Transmission | Price | Make | Model |
|---|---|---|---|---|---|---|
| Selection | 1, 0, 0 | 0, 0, 0, 0, 0, 0, 0, 0 | 0, 0 | 0, 0, 0, 0, 0, 0, 0, 0, 0, 0, 0 | 0, 0, 0, 1, 0 | 0, 0, 0, 0, 0, 0, 0, 0, 0, 0, 0, 0 |
| Status | 1, 0, 0 | 0, 0, 0, 0, 0, 0, 0, 0 | 0, 0 | 0, 0, 0, 0, 0, 0, 0, 0, 0, 0, 0 | 0, 0, 0, 1, 0 | 0, 0, 0, 0, 0, 0, 0, 0, 0, 0, 0, 0 |
| Frequency | 0, 0, 0 | 0, 0, 0, 0, 0, 0, 0, 0 | 0, 0 | 0, 0, 0, 0, 0, 0, 0, 0, 0, 0, 0 | 0, 0, 0, 0, 0 | 0, 0, 0, 0, 0, 0, 0, 0, 0, 0, 0, 0 |

Using the updated selection vector resulting from each modification thereof, the final data structures can be processed and an initial status vector for each such final data structure can be instantiated, starting with the designated starting table and progressing through any other final data structures containing the data element type affected by the query. The initial status vector for each final data structure can have a number of positions equal to the number of records in the data structure. So in the case of the present example this vector will have 16 positions, one for each of the 16 records contained in the starting table, Table 8. In an embodiment of the present disclosure, this initial table status vector can have a single bit in each position that will be used to indicate whether the corresponding record includes a selected data element value as contained the selection vector. The selection vector can be compared with the various records comprising the final data structures, in this case the starting Table 8, which comparison would result in an initial status vector for the table with a "1" in each position for records which have a data element value in the affected data element type that matches the data element value for such data element type in the selection vector. Note that in the present example, the values in each column of Table 8a are numbers from "0" to "n" where "n" is equal to the number of unique data element values for that data element type minus one (since the methods and systems started with the first listed value equal to "0") while the selection vectors are in the format of a Boolean string with a "1" in the position of the selected data element value. Even though the format of the numbers are different, the comparison can still be made.

In the present example, the initial status vector for Table 8a will have a "1" in the positions corresponding to the first five records, and a "0" in all the other positions, indicating that only the first five records have "Coupe" indicated for the data element type, "Type." Similarly after processing the updated selection vector due to the further selection of "Honda," the updated status vector for the table will indicate that only records one through three match both of these query criteria, and record 13 matches Honda but not Coupe. The updated status vector for Table 8 is set forth Table 8c.

TABLE 8c

| Initial table status vector | |
|---|---|
| After selection of Coupe: | 1, 1, 1, 1, 1, 0, 0, 0, 0, 0, 0, 0, 0, 0, 0, 0 |
| After selection of Honda | 1, 1, 1, 0, 0, 0, 0, 0, 0, 0, 0, 0, 1, 0, 0, 0 |

In addition to instantiating the initial data structure for the tables or other final data structures, the status vectors for each data element type can also be updated with each update of the status vector for each final data structure. Since the initial status vector for Table 8 after the selection of "Coupe" indicated that only records one through five had "Coupe" as a value for the data element type "Type," only these matching records need be examined for the other data element types comprising each record. As each of the first five records is examined, the status vector for each final element type can be updated to reflect the presence of the particular data element value for that data element type. Accordingly the vector for the data element type "Type" will remain "1,0,0" since all five records have the data element value "Coupe." The vector for the data element type "Engine" will have a value of "1" for the position corresponding to the data element value "1.8" and "0's" for the other positions. The vector will not change after processing the second record since it also includes a "1.8." After processing the third record this vector will change to include a 1 in the 4th position since this record includes a data element value of "2.4." The remaining vectors can be updated in the same manner. Accordingly, the updated status vectors for each of the data element types after processing the selection vector reflected the selection of "Coupe" is set forth in Table 8d.

TABLE 8d

| | Field Element Type Status Vectors reflecting the selection of Coupe | | | | | |
|---|---|---|---|---|---|---|
| Record | Type | Engine | Transmission | Price | Make | Model |
| 1 | 1, 0, 0 | 0, 1, 0, 0, 0, 0, 0, 0 | 1, 0 | 0, 0, 0, 1, 0, 0, 0, 0, 0, 0, 0 | 0, 0, 0, 1, 0 | 0, 0, 0, 1, 0, 0, 0, 0, 0, 0, 0, 0 |
| 2 | 1, 0, 0 | 0, 1, 0, 0, 0, 0, 0, 0 | 1, 1 | 0, 0, 1, 1, 0, 0, 0, 0, 0, 0, 0 | 0, 0, 0, 1, 0 | 0, 0, 0, 1, 0, 0, 0, 0, 0, 0, 0, 0 |
| 3 | 1, 0, 0 | 0, 1, 0, 1, 0, 0, 0, 0 | 1, 1 | 0, 0, 1, 1, 0, 0, 1, 0, 0, 0, 0 | 0, 0, 0, 1, 0 | 1, 0, 0, 1, 0, 0, 0, 0, 0, 0, 0, 0 |
| 4 | 1, 0, 0 | 0, 1, 0, 1, 0, 0, 0, 1, 0 | 1, 1 | 0, 0, 1, 1, 0, 0, 1, 0, 0, 0, 0 | 0, 1, 0, 1, 0 | 1, 0, 1, 1, 0, 0, 0, 0, 0, 0, 0, 0 |
| 5 | 1, 0, 0 | 0, 1, 0, 1, 0, 0, 1, 1 | 1, 1 | 0, 0, 1, 1, 0, 1, 1, 0, 0, 0, 0 | 0, 1, 1, 1, 0 | 1, 0, 1, 1, 0, 0, 0, 0, 0, 1, 0, 0 |

After the selection of "Honda" the selection vector will be updated as illustrated in Table 8c, however, the status vectors for the field element types need not be updated since the first three records have already been processed and the values have not changed.

As the status vector for each data element type for each record is updated, the frequency vector for that data element type can also be updated. The frequency vector for each data element type reflects a count of the various data element values in that data element type. Accordingly with each occurrence of a data element value within the records the position of the frequency vector is incremented by one. The updated frequency vectors for records one through five, reflecting the selection of "Coupe" are illustrated in Table 8e. This process can be repeated for further selections, such as the selection of Honda in the present example.

As before, an initial status vector can be created for the table. This table status vector can be used for the storage of intermediate combinations of associations. In an aspect, for each data record one or more of the following steps are taken. First, for each data element value in the record, the Boolean string corresponding to that data element value in the status vector for each data element type can be found. Next these strings can be combined by applying a logical inclusive OR operation. Next, the Boolean string resulting from this operation can be stored at the position in the table status vector corresponding to the current data record. This process can be repeated for each record in the final data structures. The resulting status vector for Table 8 is illustrated in Table 8g.

TABLE 8e

Field Element Type Frequency Vectors reflecting the selection of Coupe

| Record | Type | Engine | Transmission | Price | Make | Model |
|---|---|---|---|---|---|---|
| 1 | 1, 0, 0 | 0, 1, 0, 0, 0, 0, 0, 0 | 1, 0 | 0, 0, 0, 1, 0, 0, 0, 0, 0, 0, 0 | 0, 0, 0, 1, 0 | 0, 0, 0, 1, 0, 0, 0, 0, 0, 0, 0, 0 |
| 2 | 2, 0, 0 | 0, 2, 0, 0, 0, 0, 0, 0 | 1, 1 | 0, 0, 1, 1, 0, 0, 0, 0, 0, 0, 0 | 0, 0, 0, 2, 0 | 0, 0, 0, 2, 0, 0, 0, 0, 0, 0, 0, 0 |
| 3 | 3, 0, 0 | 0, 2, 0, 1, 0, 0, 0, 0 | 1, 2 | 0, 0, 1, 1, 0, 0, 1, 0, 0, 0, 0 | 0, 0, 0, 3, 0 | 1, 0, 0, 2, 0, 0, 0, 0, 0, 0, 0, 0 |
| 4 | 4, 0, 0 | 0, 2, 0, 1, 0, 0, 1, 0 | 2, 2 | 0, 0, 1, 1, 0, 0, 2, 0, 0, 0, 0 | 0, 1, 0, 3, 0 | 1, 0, 1, 2, 0, 0, 0, 0, 0, 0, 0, 0 |
| 5 | 5, 0, 0 | 0, 2, 0, 1, 0, 0, 1, 1 | 2, 3 | 0, 0, 1, 1, 0, 1, 2, 0, 0, 0, 0 | 0, 1, 1, 3, 0 | 1, 0, 1, 2, 0, 0, 0, 0, 0, 1, 0, 0 |

In another embodiment of the present methods and systems, the status vectors for the final data structures and for the data element types can have a number of bits in each position that is equal to or greater than the number of data element types in which selections have been made in the query. Thus as selections are added, another bit can be added to each position of these vectors. Accordingly, in the present example in which two selections have been made in two data element types, each position within these vectors will have at least two bits. Also within these vectors each position will contain additional information reflecting the order of the selections. Each such data element type is therefore assigned a unique and subsequent position within the vectors to indicate an association with the selections in that data element type. In this example "Type" is assigned the first position and "Make" assigned the second.

In this embodiment, the initial status vector for each data element type is cleared (all positions set to 0). If the corresponding data element value exists in the selection vector, the position in the status vector corresponding to the data element type is set to 1. This process is repeated for the "Make" data element type. Accordingly the status vector after the receipt of a query selecting "Coupe" and "Honda" is illustrated in Table 8f. Note that within this vector "Coupe" is indicated as the first selection with the value "01," and "Honda" is indicated as the second selection with the value "10."

TABLE 8g

| Initial table status vector | |
|---|---|
| After selection of Coupe and Honda: | 11, 11, 11, 01, 01, 0, 0, 0, 0, 0, 0, 0, 10, 0, 0, 0 |

Once the table status vector for the final table(s) has been determined, it can be associated with a unique identifier (typically a hash function) and this information, reflecting the data element value for each data entry type for each record in the final data structure(s), can be stored in memory. A final status vector for each data element type reflecting the results of the query can then be computed based upon the table's initial status vector. For each element of each data element type's status vector, the subset of records in the table that contain a data element value corresponding to the element currently being computed can be examined. From this subset the largest of all of the elements in the table status vector that correspond to records in the subset being examined can be selected. The definition of largest in this context can comprise, for example, imposing a strict partial order on the set of combinations of associated data element types as represented by Boolean strings. The criteria used to impose such an order include, but are not limited to, the number of TABLE 8f Updated Status Vector for the various data element types after receipt of Query selecting both Coupe and Honda

| Vectors | Type | Engine | Transmission | Price | Make | Model |
|---|---|---|---|---|---|---|
| Status | 01, 00, 00 | 00, 00, 00, 00, 00, 00, 00, 00 | 00, 00 | 00, 00, 00, 00, 00, 00, 00, 00, 00, 00, 00 | 00, 00, 00, 10, 00 | 00, 00, 00, 00, 00, 00, 00, 00, 00, 00, 00, 00 | associated data element types, whether a particular field is present, or by assigning weights to the presence of each field and using the weight to determine order. The vectors in Table 8h represent the resulting status vector after processing the query for records matching the data element values "Coupe" and "Honda." Within these vectors note that the value "11" indicates that the represented data element value has matched both query criteria, the value "01" indicates that the represented data element value has matched only the first criterion, and the value "10" indicates that the represented data element value has match only the second criterion.

The status vector therefore indicates that the data element "Coupe" as one of the selection criteria matched both selections. The data element value "Sedan," however, while not matching the first selection did match the second selection. Accordingly at least one record matched "Honda" while not matching "Coupe" (rather it matched "Sedan" as denoted by the "10" entry in the "Type" Data Element Type). The frequency vector illustrated in Table 8h indicates that there were three occurrences of the data element value "Coupe" within the matching records. Similarly there were two occurrences of the data element value "1.8" within the matching records. Note that, as with the first embodiment with the two selections, only the first three records are of interest.

TABLE 8h

Final Status and Frequency Vectors after traversing all records in Table 8

| Vector | Type | Engine | Transmission | Price | Make | Model |
|---|---|---|---|---|---|---|
| Status | 11, 00, 10 | 00, 11, 00, 11, 00, 00, 01, 01 | 11, 11 | 00, 00, 11, 11, 00, 01, 11, 00, 00, 00, 00 | 00, 01, 01, 11, 00 | 11, 00, 01, 11, 00, 00, 00, 00, 00, 01, 00, 00, 00 |
| Frequency | 3, 0, 0 | 0, 2, 0, 1, 0, 0, 0, 0 | 1, 2 | 0, 0, 1, 1, 0, 0, 1, 0, 0, 0, 0 | 0, 0, 0, 3, 0 | 1, 0, 0, 2, 0, 0, 0, 0, 0, 0, 0, 0, 0 |

If a user were now to select the data element value of "Accord" in the data entry type "Model" the above process would be repeated to reflect this additional criteria in the query. The only remaining record which matches all three of these criteria is record 3. Record 13 matches "Accord" as well as "Honda," but no other matches with "Accord" shall be found. It is important to note that after processing the first query, it is already known which records match the criteria of that first query; additionally, the result of this new query will be similar to the previous query except that an extra Boolean digit will be appended to all of the status vectors according to whether a match with "Accord" is found in the corresponding records. It is therefore possible (without departing from the scope of the present application), but not required, to use the status vectors resulting from that first query as input to the logical inclusive OR operation as described above instead of carrying out the steps required to evaluate the criteria common to both the first and subsequent queries.

It is therefore possible to determine which records match the query by comparing the various status vectors. The above described vectors can also be associated with an identifier (typically an identifier associated with the stored query vector) and stored in memory to be recalled whenever the same query is repeated. For example records 1 through 5 all include "Coupe" within the "Type" data element type, and the remaining records do not include a "Coupe" within the "Type" data element type, while only the first three records match both "Coupe" and "Honda." Similarly the stored status vectors for the other data element types will indicate the data element values for each of these types, within the various records. In this manner if the query is reprocessed, the results are already known and can be retrieved with minimal additional processing whenever the same query is reused. It should be noted that the query itself (or its identifier) can also be considered the unique identifier for the results, since the intent is to associate the query with the results of that query because unless there is a change in the underlying data, a given query will always yield the same results. Once the query/result combination is cached or stored in memory, it can easily be retrieved if the query is repeated, without a need for additional processing to recalculate the results.

It should be noted that the query and query results can be stored independent of the initial and final data structures which reflect the data in the database, and also independent of the actual data in the database. Independent storage and retrieval of these elements enables storage of multiple query/result combinations. Each of these query/result combinations can represent a particular data state, and accordingly multiple data states can be stored, including the initial state in which no query or data selections have been made. Furthermore, each of the data states represented by the stored structures and vectors can be easily recalled and used as desired. In particular, in an embodiment of the present disclosure, the stored structures and vectors can be represented by various visualizations.

An embodiment of the disclosure can include the creation and display of visualization objects (such as graphs, charts, list boxes, tables, etc) for at least each of the data element types comprising the query, as is illustrated in FIG. 6. As described further with respect to FIG. 6, the non-shaded values represent the exact match all of the criteria, the light grey shaded values match one or more, but not all of the query criteria, and the dark grey shaded values do not match any of the criteria. Although not shown, it is apparent that the stored vectors can also show the records matching only the second criterion and not the first, and vice versa. The teachings of the present disclosure enable the user to determine "degrees of query match."

As is apparent from FIG. 6, the original alpha-numeric values for the applicable data element types and data element values have been restored (e.g., instead of the assigned binary codes) utilizing the initial data structures. Also as is apparent from FIG. 6, list boxes for other data element types can also be displayed. These list boxes are able to include not only the data element values matching the query, but also the data element values that would have been normally been excluded as a result of the query, absent the teachings of the present disclosure. Again, for the purpose of enabling a better understanding, the data element values that were the subject of the query have been highlighted in green, the results matching all of the elements of the query are illustrated without highlighting, the results matching the element of the query that was first entered but not one or more other elements of query are illustrated with a light grey shading, and the results which do not match any elements of the query are illustrated with dark grey highlighting.

In an aspect, the methods and systems can utilize various pre-defined database objects, such as various charts, graphs, tables, list boxes, etc., that can be represented by the static information needed to render the objects, such as the object type, name, format, shape, elements, etc. This static information can be contained in javascript, css or html coding that is read by the rendering engine as required to render the basic object. In addition each object can include certain dynamic information, which can be user specified, such as the applicable labels, titles, orientations, colors, dimensions, measurements, sort orders, etc. Finally in order to actually render the final object, the actual data or data state to be visualized with the object can be specified. In an aspect, the information required for rendering an object can include calls to the applicable static information for that object, as well as to the vectors associated with the particular data state for the object. This information can be combined with the specified dynamic information when the object is created, to fully render the object. As can be appreciated, the data and static information required to render a particular visualization need only be specified when the visualization is created. It can then be associated with an applicable hash function and stored. Accordingly, when an object is specified by a user, an embodiment of the present methods and systems can create a hypercube or other data structure that includes the data and static information along with the calls necessary to retrieve and utilize the static information and data state necessary to render the object. For convenience the term hypercube will be used for future reference to this data structure although other data structures could be utilized. Typically a user will specify more than one object in order to visualize and understand the data being displayed. In this case the entire collection of objects, as well as each individual object will be associated with a unique identification code or hash function and stored in a manner that it can be recalled. Thus each object as well as each collection of objects can be easily re-created or reproduced merely by referencing the applicable hash function, and without requiring the reprocessing of any data. In addition multiple collections of visualization can easily be stored and retrieved.

Through the teachings of the present disclosure therefore, with the separate storage and easy retrieval of the individual data structures, vectors, and visualization hypercubes, apart from the actual data it is possible to create multiple data states and multiple visualization states, all of which can be separately stored and easily recalled. And this can be done without the underlying database being changed, either when the states or presentations are created or when they are called. Rather the data states and visualizations are stored as independent vectors and hypercubes, so additional states and visualizations can be added and stored as additional vectors and hypercubes, each of which can be independently recalled and utilized. Furthermore, security and privilege features can be added to control the users and conditions under which the various vectors and hypercubes can be called, used or modified. Furthermore, the present methods and systems can identify the various vectors and hypercubes by time, state, user, point of focus, queries represented, and other criteria. For example a particular data state and visualization can be set so that it only can be recalled and used by identified users. Similarly a state and visualization can be set so that it reflects a particular time period or focus.

In addition, an embodiment of the present methods and systems also allows a user to associate "weights" with specific query criteria and/or with the number of criteria matched since the vectors reflect not only which data element types and data element values were matched, but also the number that were matched. The frequency vectors can be used for the purpose of determining the number that were matched. As is apparent from FIG. 5, data records 1-5 have Coupe (data element value "0") as their Type, and records 1-3 and 13 have Honda (data element value "3") as their Make. If this were a search using the techniques of the prior art, the results of the search would yield only the data associated with the three data records since these are the only vehicles that are both Coupes and Hondas. All the rest of the data would be excluded with these prior art techniques. However with the present methods and systems these data are not excluded and remain available for analysis as illustrated in FIG. 5.

Accordingly, and as is illustrated in FIG. 5 and FIG. 6, vehicles that are both Coupes and Hondas have either a 1.8 or 2.4 engine, transmissions that can be either automatic or manual, a price of $18,000; $19,000; or $23,000, and are either an Accord or a Civic. These alternatives are shown without any shading. Using the techniques of the present disclosure, FIG. 6 however, contains substantially more information, and this information is displayed in a manner that does not obscure the result set that totally matches the search criteria (i.e., the values displayed without shading.)

FIG. 6, therefore, includes data element values displayed in a light grey shading (e.g., Engines having values 3.6 and 3.7) and in dark grey shading (e.g., Engines having values 1.6, 2.0, 2.5 and 3.5). Referring to Tables 1-8, it can be determined that Coupes (Type 0) can have Engines with the binary codes 1, 3, 6, or 7 which have been shaded in blue in FIG. 5 (or with the actual values 1.8, 2.4, 3.6, and 3.7), but do not have Engines with the binary codes 0, 2, 4, or 5 (or with the actual values 1.6, 2.0, 2.5, or 3.5). Similarly Hondas can have Engines with the binary codes 1 and 3 which have also been shaded in blue in the figure (or with the actual values 1.8 and 2.4) but do not have Engines with the binary codes 0, 2, 4, 5, 6, or 7 (or with the actual values 1.6, 2.0, 2.5, 3.5, 3.6, or 3.7.) Comparing both Hondas and Coupes they can both have Engines with the binary codes 1 and 3 shaded in the darker blue in the figure (or with the actual values 1.8 and 2.4.) However, Honda Coupes do not have Engines with the binary codes 0, 2, 4, 5, 6 or 7 (or with actual values 1.6, 2.0, 2.5, 3.5, 3.6, or 3.7). Note that while Coupes do have Engine sizes with binary codes 6 and 7 (or with actual values 3.6 and 3.7), Hondas do not. The blue shaded cells in FIG. 5 include the first three rows of values (not including the header row), but excluding the values in the "Type" and "Make" columns.

FIG. 6 makes this clear by shading the values which match some, but not all of the criteria in a lighter shade of grey (e.g., engines that are 3.6 or 3.7 in size, and values which do not match any of the criteria in a darker shade of grey (e.g., Engines that are 1.6, 2.9, 2.5, or 3.5 in size). Shading is only one way, of many ways, to visually indicate these characteristics and other graphic or informational treatments that permit a display of totally matching, partially matching, and not matching are all within the scope of the present disclosure.

Figure 3C:
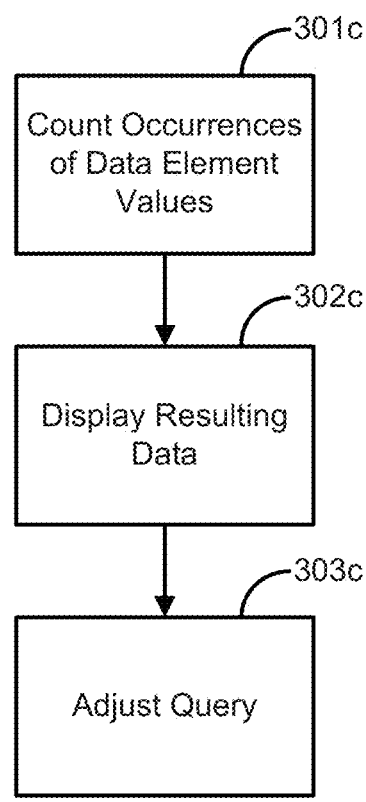
FIG. 3c illustrates the steps of a method according to one embodiment of the present disclosure.

As shown in FIG. 3c, utilizing the frequency vectors described above it is also possible to count such things as the number of records matching one or more data element values of the query, the number of data element types and/or data element values of the query that have been matched within a record (and/or in the aggregate) the frequency of each of the data element values (matched or unmatched) appearing within the matching records and/or the unmatched records, and so forth; and to display the results of such counting operations. Various embodiments of the present disclosure can include any combination of these and other counts. The displayed data element types and/or data element values can be sorted by their frequency of occurrence in the result data object or by other sorting parameters. With one or more embodiments of the present methods and systems this sorting can be facilitated through the use of the assigned binary codes.

At step 301c, for the identified records, the methods and systems can identify the data element types that contain the relevant data element values and count the number of unique data element values within in each data element type. At step 302c, the methods and systems can display resulting data, such as the names of the data element types that contain relevant data element values, the unique data element values in each of the displayed names of the data element types and a count (See FIG. 7) of the number of occurrences of such data element values. At step 303c, the methods and systems can adjust the query (e.g., return to step 301b of FIG. 3b) in the event of any selection or de-selection of a displayed data element type or data element value.

For example in Table 8e it is evident that there were five records matching the data entry type "Coupe," of which with respect to data entry type "Engine," two had a value of "1.8," with one record each for the values "2.4," "3.6," and "3.7." Similarly there are three records having a Manual transmission and two records having an automatic transmission. Furthermore, after the selection of Honda, there were now only 3 records which match both "Coupe" and "Honda," of which with respect to data entry type "Engine," two had a value of "1.8," with one record for the value "2.4." Similarly there are two records having a Manual transmission and one record having an automatic transmission. An example of a potential data display as a result of this counting operation is shown in FIG. 7 wherein the names of the data element types that contain relevant data element values resulting from the query, as well as the unique data element values for each of the displayed names, and a count of the number of occurrences of these data element values within the database. FIG. 7 shows an updated example of FIG. 6 in which two additional columns per list box have been added to display the number of occurrences of each data element value in each data element type (the first added column) and the number of query terms that such data element value matched. For example, with respect to the data element type "Engine," the first data element value "1.8" was found in two of the records (first added column) fully matching the query criteria, and it was found in records matching both (second added column) "Coupe" and "Honda." Contrastingly, a "2.4" engine was found in only one record, but it still was a match in both query criteria. It should be noted that while the values in both of these columns can be determined from that foresaid vectors and data structures, these columns need not be displayed in a visualization, rather which of these column is displayed is user configurable. The number within the added columns of FIG. 7 can be used to sort the data element values within the visualization further illustrating the "degrees of query match" indicating by the various shaded areas. In this example "Manual" can be sorted above "Automatic" in the Transmission field. In this example the list boxes are first sorted by "degrees of query match" then number of occurrences of a value in a given field followed by alphabetical or numerical sorting depending on the data type and preference. This sorting order is again user configurable and all sorting orders are considered to fall within the scope of the present disclosure.

Utilizing the teachings of the present disclosure, the process of querying a database can be substantially more robust, since all of the data element values in the database remain available for analysis. From the data display of FIG. 7 it is possible to view not only the direct results of the query but also the results which closely match the query along with a count indicated the degree of the match. For example, with a query that uses three data element types it is possible to see results which only match one or two of the results, and so forth. In FIG. 7 the data element types that are the subject of query appear in a selected color or graphic treatment, in this instance, they are shaded green (the first row in the "Type" table and the first row in the "Make" table). The data element values which completely match the query appear in a contrasting color or graphic treatment, in this instance, they are not shaded (or have a white background). The data element values which do not match any of the query requirements appear in yet another contrasting color or graphic treatment, in this instance, they are shaded dark grey. The data elements which match some, but not all, of the query requirements appear in yet another contrasting color or graphic treatment, in this instance, they are shaded a lighter shade of grey. In addition FIG. 7 also indicates the number of query criteria actually matched.

FIG. 8 is a similar visualization which in this instance illustrates not only the number of records which were matched by the query criteria, but also which of the data element types within the query provided the match. Again, the particular information which is displayed is user configurable.

This ability to see closely matching data as well as matching data facilitates better decision making. For example if a user searched a travel database for flights leaving from Chicago going to New York, on US Air, and leaving before 8:00 AM on Monday, the prior art database systems would only display the matching flights, while with the teachings of the present disclosure, alternative flights from other airlines (for example matching the city and departure criteria but not the airline criteria) could be displayed. Similarly a user can be presented with flights not only from other airlines but also flights leaving at 8:15 AM.

In addition, since all of the data in the database remains available for analysis, the queries being made can be changed dynamically and in real time, with the results of the query being updated, also dynamically and in real time. Query changes may also include selection or de-selection of any of the displayed data element types or data element values. If Query changes do occur, one or more steps of FIG. 3b and/or FIG. 3c can be repeated as needed.

Furthermore in an embodiment of the present disclosure, priority values can be assigned to the data element types and data element values used within the query. Such data priority values can be used to manipulate the sort order, graphic and/or informational treatment applied to data elements when they are displayed by the techniques of the present disclosure. For example with the travel database the departure time can be weighed heavier than the airline, and the result set will be adjusted accordingly.

Returning to the previous automobile example, an additional selection can be made in Transmission type by selecting the value "Manual." Since there are now selections in three separate fields there can be values that match all three, two out of three, one out of three or none in terms of "degrees of matching." This has been illustrated in FIG. 9. For example if we now look at the Engine field we can see that 1.8 and 2.4 match all the specified criteria. Engine size 3.7 matches both the selection in Type and Transmission (Trans.). The value 3.6 only matches Type. The values 1.6 and 2.0 match Transmission only. Similar to previous examples the "degrees of matching" is represented by various graphic treatments like the illustrated gray shading. In this case 3 shades are used: a lighter shade for those matching 2 out of 3; a medium shade for those matching 1 out of 3; a darker shade for those matching 0.

As discussed with the flight example some fields may be more important to a given result set than others. For the discussed example in FIG. 9 the field "Type" will take precedent, e.g. sorted first when the situation arises. If the "Engine" field is reviewed again the following sort order can apply: sort by "degree of matching" indicated by the gray shading and sort by the preferred field in this case "Type." In the "Engine" field there are 3 values that match only one field 3.6, 1.6, and 2.0. The value 3.6 is sorted first in this list as the system has been defined to give preference (or a higher weighting) to the "Type" field. Since 3.6 matches the "Type" field and 1.6 and 2.0 match the "Transmission" field 3.6 is sorted first.

The weighting can be a list of field names or even a combination thereof. So for example given such a dataset the combination of Type and Transmission (Type, Trans.) can take priority over Type and Make (Type, Make). Additionally the weighting can be user-configurable either before or during data analysis. A desired priority for some or all field names or combinations thereof may be configured on a temporary or permanent basis which is to be used for all queries. Additionally or alternatively, a user can adjust the priority of fields based upon fields selected in the current query. This priority can be achieved by multiple means including the order in which the criteria are specified or as part of the definition of the particular visualization object.

Furthermore in an embodiment of the present disclosure, it is possible to perform free-form searches in which the data element values and the data element types are searched for a particular search term in order to find those data records matching either all or particular combinations of the search terms. Boolean type searches search all data element types for each individual search term entered. This is complex and consumes significant computing resources. The teachings of the present disclosure greatly simplify the process of performing free-form searches by taking advantage of the separation and separate storage of the data element types and the data element values from the data records, and by searching data element types individually before finding an association between the types according to the search criteria.

For example, if the free-form search query "automatic ford" is entered, the entry is typically interpreted as finding those data records where one of the fields contains "automatic" and one of the fields contains "ford." This is typically translated into a Boolean query such as (Type BEGINS WITH "automatic" OR Transmission BEGINS WITH "automatic" OR Make BEGINS WITH "automatic" OR Model BEGINS WITH "automatic") AND (Type BEGINS WITH "ford" OR Transmission BEGINS WITH "ford" OR Make BEGINS WITH "ford" OR Model BEGINS WITH "ford"). As can be seen such an entry is complex and will consume significant resources to process. The complexity of such a query increases with the number of fields and search terms involved, usually rendering such free-form searches impractical or computationally expensive.

This is not the case according to the teachings of the present disclosure. For simplicity, if the query criteria are alphabetic, then an embodiment of the present methods and systems can exclude searching the numeric fields Engine and Price. An embodiment of the present methods and systems can also start a free-form search by searching each field individually for each individual search term or phrase, creating a status vector for the field representing the data element values that match one or more of the search terms. The Boolean query used to determine the matching data records is the logical conjunction of the free-form searches for each search term, the free-form searches being a logical disjunction of searches of each field for the search term; the Boolean query is one such example of this form of query. Notably, the methods and systems do not have to evaluate the entire query for each record or data element value, but instead specific expressions within that query. The Boolean strings in all of the status vectors must be long enough to contain the result of each and every Boolean expression necessary to compute the entire Boolean query correctly and without ambiguity; a minimal expression that will satisfy this property is a binary operator accepting one of the search terms and a value of a data element type. Two examples of such expressions are 'Model BEGINS WITH "ford"' or 'Engine>2.0'. Each of these Boolean expressions is assigned a unique and subsequent position in the Boolean strings in the same way that data element types are assigned such positions as described above. At the end of this process every Boolean expression in the query must be valid. The definition of a valid Boolean expression is recursive and defined by the following criteria (a) it has been assigned a position in the Boolean strings in the status vectors, and (b) it must be a logical conjunction, disjunction or negation of valid Boolean expressions.

Each data element value in each data element type can be processed, either evaluating each Boolean expression against the value or ignoring it if the expression does not refer to this data element type, then a Boolean string can be generated consisting of the results of the expressions (where true corresponds to 1 and false or ignored to 0) and stored in the status vector at the position corresponding to the data element value. Using the example data set and search terms, since there are 8 minimal Boolean expressions required to compute the entire Boolean query, one for each search term/data element field combination, each Boolean string in the status vectors is 8 digits long. There are only two data element values for which one of the Boolean expressions evaluate to true: "Automatic" in Transmission and "Ford" in Make. Using the same order as given in the example Boolean query, the second bit (corresponding to the Boolean expression "Transmission BEGINS WITH 'automatic'") can be set to 1 in the string corresponding to "Automatic", and the seventh bit (corresponding to the Boolean expression 'Make BEGINS WITH "ford"') can be set to 1 in the string corresponding to "Ford". The resulting status vectors representing this search are set forth in Table 9a.

TABLE 9a

Status Vectors for the various data element types after receipt of free-form search query "automatic" AND "ford"

| Type | Engine | Transmission | Price | Make | Model |
|---|---|---|---|---|---|
| 00000000, | 00000000, | 01000000, | 00000000, | 00000000, | 00000000, |
| 00000000 | 00000000, | 00000000 | 00000000, | 00000000, | 00000000, |
| 00000000 | 00000000, | | 00000000, | 00000010, | 00000000, |

TABLE 9a-continued

Status Vectors for the various data element types after receipt of free-form search query "automatic" AND "ford"

| Type | Engine | Transmission | Price | Make | Model |
|---|---|---|---|---|---|
| | 00000000, | | 00000000, | 00000000, | 00000000, |
| | 00000000, | | 00000000, | 00000000 | 00000000, |
| | 00000000, | | 00000000, | | 00000000, |
| | 00000000, | | 00000000, | | 00000000, |
| | 00000000 | | 00000000, | | 00000000, |
| | | | 00000000, | | 00000000, |
| | | | 00000000, | | 00000000, |
| | | | 00000000 | | 00000000, |
| | | | | | 00000000, |
| | | | | | 00000000, |
| | | | | | 00000000 |

Having created the initial status vectors for each data element type, the query can be calculated, resulting in the table status vectors shown below in Table 9b. Table 9c illustrates the final status vectors for the data element types after traversing all of the records.

TABLE 9b

Initial table status vector

After receipt of free-form search query "automatic" AND "ford":
01000000, 00000000, 00000000, 01000000, 00000010, 00000010,
01000000, 01000000, 01000000, 00000010, 01000000, 01000000,
00000000, 01000010, 01000000, 01000010

TABLE 9c

Final Status Vectors after traversing all records in Table 8

| Type | Engine | Transmission | Price | Make | Model |
|---|---|---|---|---|---|
| 01000000, | 00000010, | 01000010, | 00000010, | 01000000, | 00000000, |
| 01000000, | 01000010, | 00000010 | 01000000, | 01000000, | 01000000, |
| 01000010 | 00000010, | | 00000000, | 01000010, | 01000000, |
| | 00000000, | | 01000000, | 01000000, | 01000000, |
| | 01000010, | | 01000000, | 01000000 | 00000010, |
| | 01000010, | | 01000010, | | 00000010, |
| | 01000000, | | 01000000, | | 01000010, |
| | 00000010 | | 01000000, | | 01000010, |
| | | | 01000010, | | 01000000, |
| | | | 01000010, | | 00000010, |
| | | | 01000000 | | 01000000, |
| | | | | | 01000000, |
| | | | | | 01000010 |

It is therefore possible to determine whether a data record or data element value matches the Boolean query by retrieving the corresponding Boolean string from the corresponding status vector, substituting each Boolean expression in the query with the true or false value at the corresponding position in the Boolean string, and evaluating the query. For example, the first record in the table has the Boolean string 01000000, meaning only the second Boolean expression (Transmission BEGINS WITH "automatic") is true. Replacing the expressions in the Boolean query with their corresponding results gives the expression (0 OR 1 OR 0 OR 0) AND (0 OR 0 OR 0 OR 0)=0, so it is known that the first record does not meet the search criteria. However, the twelfth record has the Boolean string 01000010, and using the same process the expression (0 OR 1 OR 0 OR 0) AND (0 OR 0 OR 1 OR 0)=1 can be obtained; this record matches all criteria. The same process can be carried out for the data element values to determine which values of which data element types match the search terms.

An extension of the present disclosure can use these status vectors to compute additional instances of certain Boolean queries efficiently, to determine the number of search terms matched by records or data element types, and/or to indicate which combination of fields contain a valid association. This is possible because only the expensive Boolean expressions that identify which fields match which search terms are computed once, reducing the original Boolean query and any subsequent queries comprising the same expressions to a series of bitwise operations which can be computed extremely quickly.

To determine the number of search terms associated with a record, Boolean queries can be created for each search term comprising the logical disjunction of all Boolean expressions relating to that search term; the number of queries that evaluate to true corresponds to the number of matching search terms.

Each combination of fields can be found that comprise a valid association by storing each distinct Boolean string in the table status vector for which the original Boolean query evaluates to true. Determining the fields participating in a valid combination is done by finding each digit of the corresponding Boolean string that equals 1, then obtaining the field referred to in the Boolean expression corresponding to that digit.

If it is not necessary to know which of the Boolean expressions matched particular data records or data element values, a particular embodiment of this disclosure can manipulate the initial status vectors by coalescing the Boolean expressions which are subject to logical disjunction in the Boolean query. By reducing the number of expressions which have to be represented in the status vectors, the total space and computation required can also be reduced. The correctness of the query is preserved because the Boolean strings in the status vectors are themselves subject to logical disjunction during the processing of the table status vector, making them logically equivalent.

It is also possible to apply constant propagation to the Boolean query prior to calculating the first table status vector, eliding the calculation of expressions that will always evaluate to either true or false. Determining whether an expression is constant can be achieved either through prior knowledge of the data set (for example, if the maximum of the values of a data element type is known, the result of all comparisons with a value greater than that maximum can be proved without looking at any other values) or after processing some or all of the values to conclusively determine the truth of the expression.

Similarly, it is also possible to use "auto-complete functionality to facility the entry of search terms for the same reason. Again, using the stored data structures it is possible to dynamically search the content of these structures as entries are being made for the desired search criteria.) Using the discussed methods a Free Form Search with word or phrase auto-complete functionality can be improved by taking into account the search entries in the search field and ranking auto-complete suggestions based on "degrees of query match".

Figure 10A:
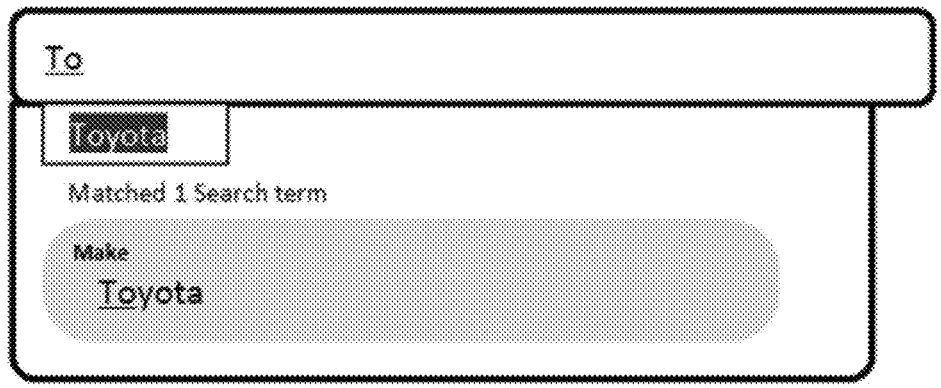
FIG. 10a illustrates an exemplary auto-complete operation.
Figure 10B:
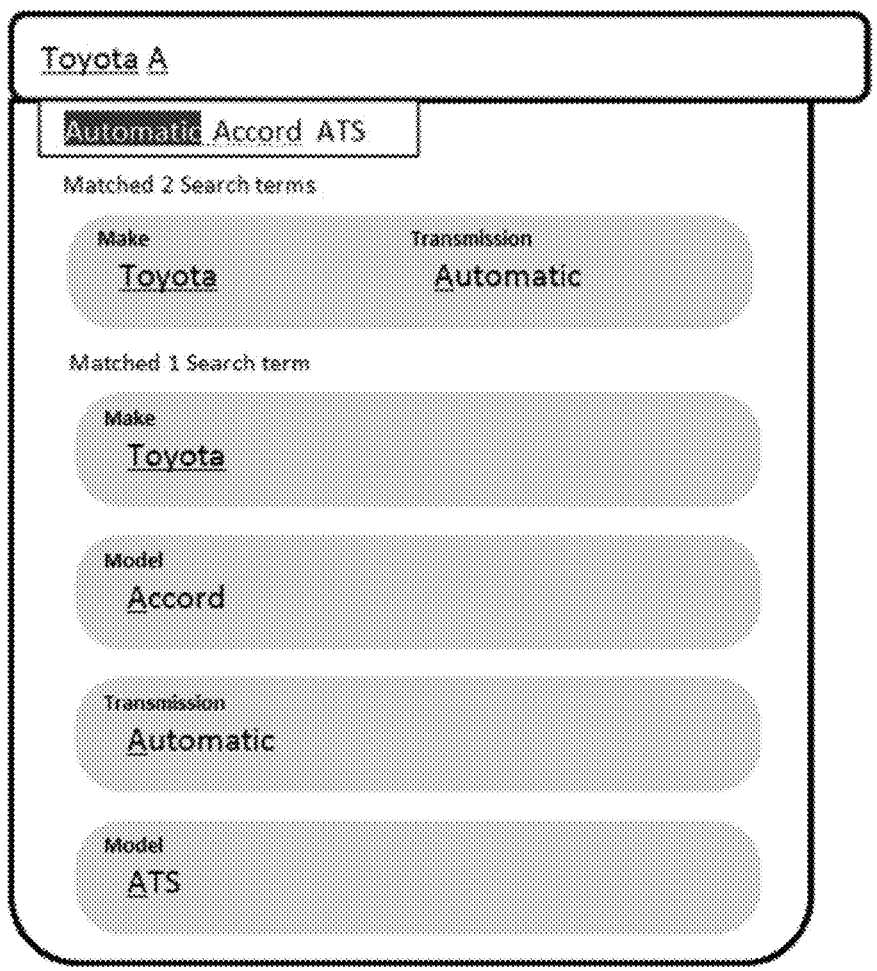
FIG. 10b illustrates another exemplary auto-complete operation.

FIG. 10a shows a simple auto-complete suggestion. The user enters "To" and all values in all fields or a sub-set of fields specified by the user are searched. In this case "To" only matches Toyota and this is subsequently suggested. In FIG. 10b the user has already entered "Toyota." The user then starts typing the letter "A" and new suggestions are given in the auto-complete functionality. Since the methods and systems are able to find all the combinations of "Toyota" and words beginning with the letter "A" using the "degrees of query method" the methods and systems are able to rank suggested words in the auto-complete higher if there is relationship or association in the underlying dataset. In this example the word "Automatic" is suggested first since the methods and systems know from interrogating the dataset that there is a valid relationship or association in the data. This association is displayed, in this example, by showing both search terms within the same shading. This embodiment continues with a display of the individual fields which are matched and "Accord" and "ATS" are displayed with a lower preference in the order since there is no relationship or association between "Toyota" and "Accord" or "ATS."

In the results section of the search the valid combinations of related or associated fields and corresponding values are shown. In this example "Toyota" in the field "Make" and "Automatic" in the Field—"Transmission" is the only valid combination that has matches in two separate distinct fields with a valid relationship or association. Furthermore, results matching only one term at a time are also shown.

FIG. 11 shows an example when the user enters "Automatic H" in the search field. In this example there are two results that match the two entered words in two distinct fields. The first result finds a valid relationship or association between "Automatic" in the Transmission field and "Honda" in the Make field. The second result finds a valid relationship or association between "Automatic" in the Transmission field and "Hatchback" in the Type field. Using the above methods the situation can occur when a word or partial word match matches in more than one field and a valid association is found in both of these matches. For example consider a product dataset with Product Category, Product Subcategory and Product data element types, and "Bike" as a value for Category, "Mountain Bike" as a value for the sub-category and "Bike 200L" as a value for the Product. If the user now searched "Bike" with the method described a result would find an association between "Bike," "Mountain Bike," and "Bike 200L."

Figure 12A:
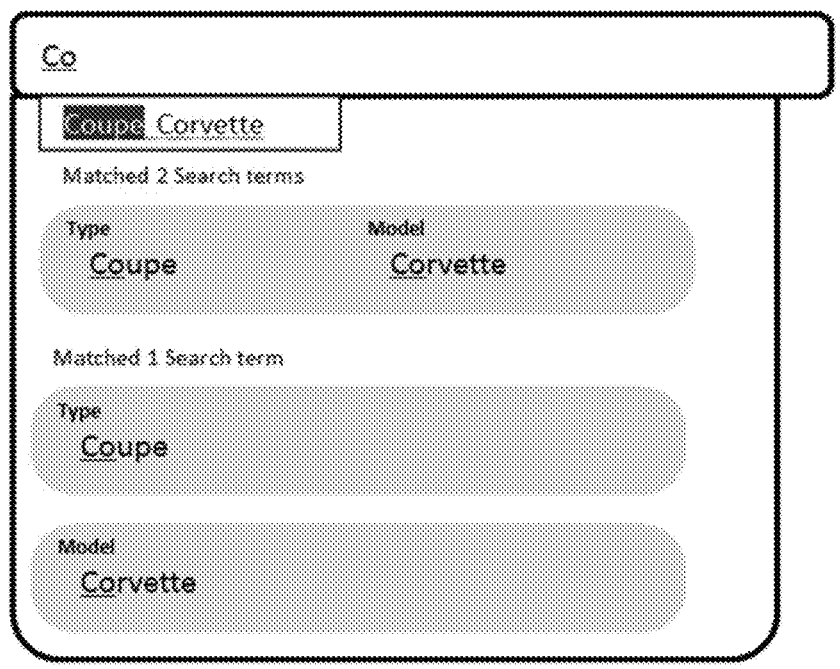
FIG. 12a illustrates a further auto-complete operation.
Figure 12B:
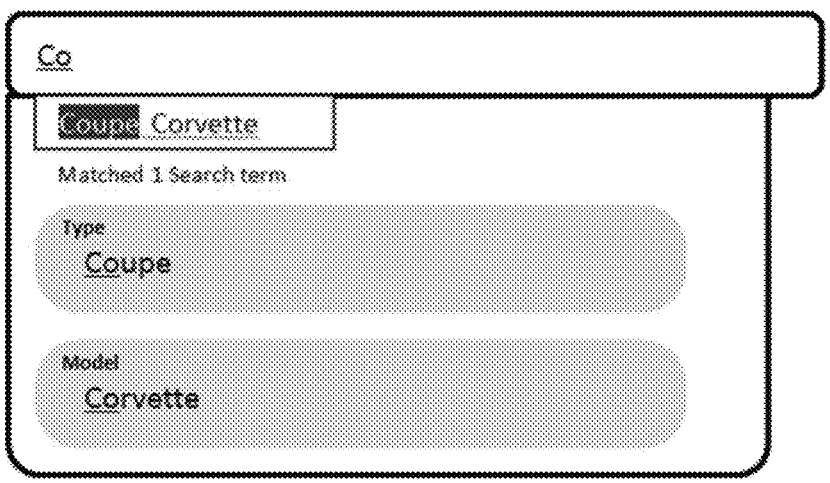

A more targeted result would be to limit the amount of valid search result combinations to searching the identical word (in this case "Bike") in only one field instead of many. To illustrate this using the previous examples shown above FIG. 12a demonstrates what would happen without this improvement. The user searches for "Co" and a valid relationship or association between the value "Coupe" in Type and "Corvette" in Model is shown. With the improvement shown in FIG. 12b it can be seen that this combination is not shown or eliminated leading to a better user experience.

Figure 12C:
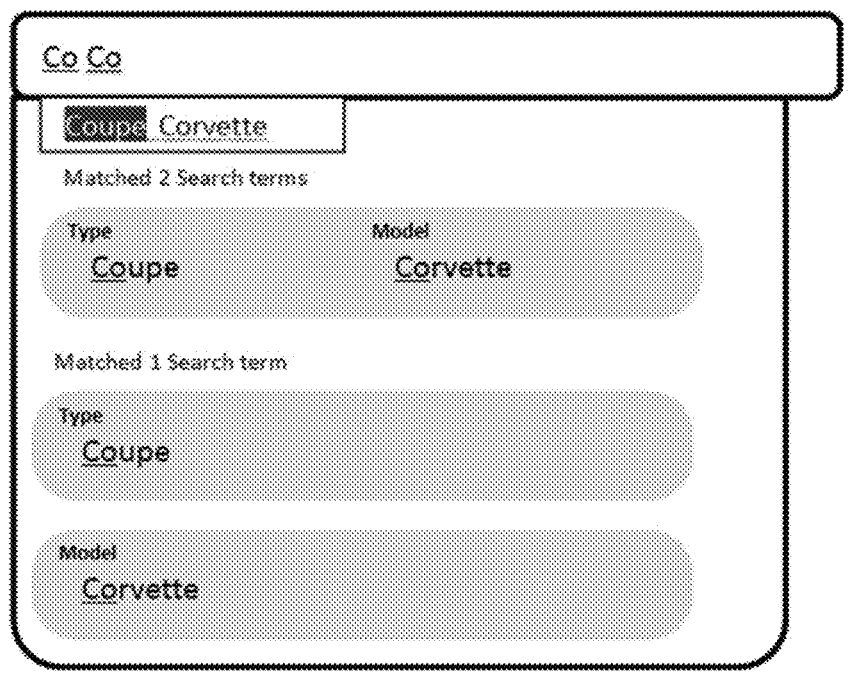
FIG. 12c illustrates entry of search terms for a specific number of field combinations.

If the user is interested in searching for relationships or associations across multiple fields then the user can explicitly enter the search terms for the number of field combinations they are looking for. For example in FIG. 12c the user has entered "Co Co" and the result gets combinations which have a valid relationship or association across two different fields.

Figure 13A:
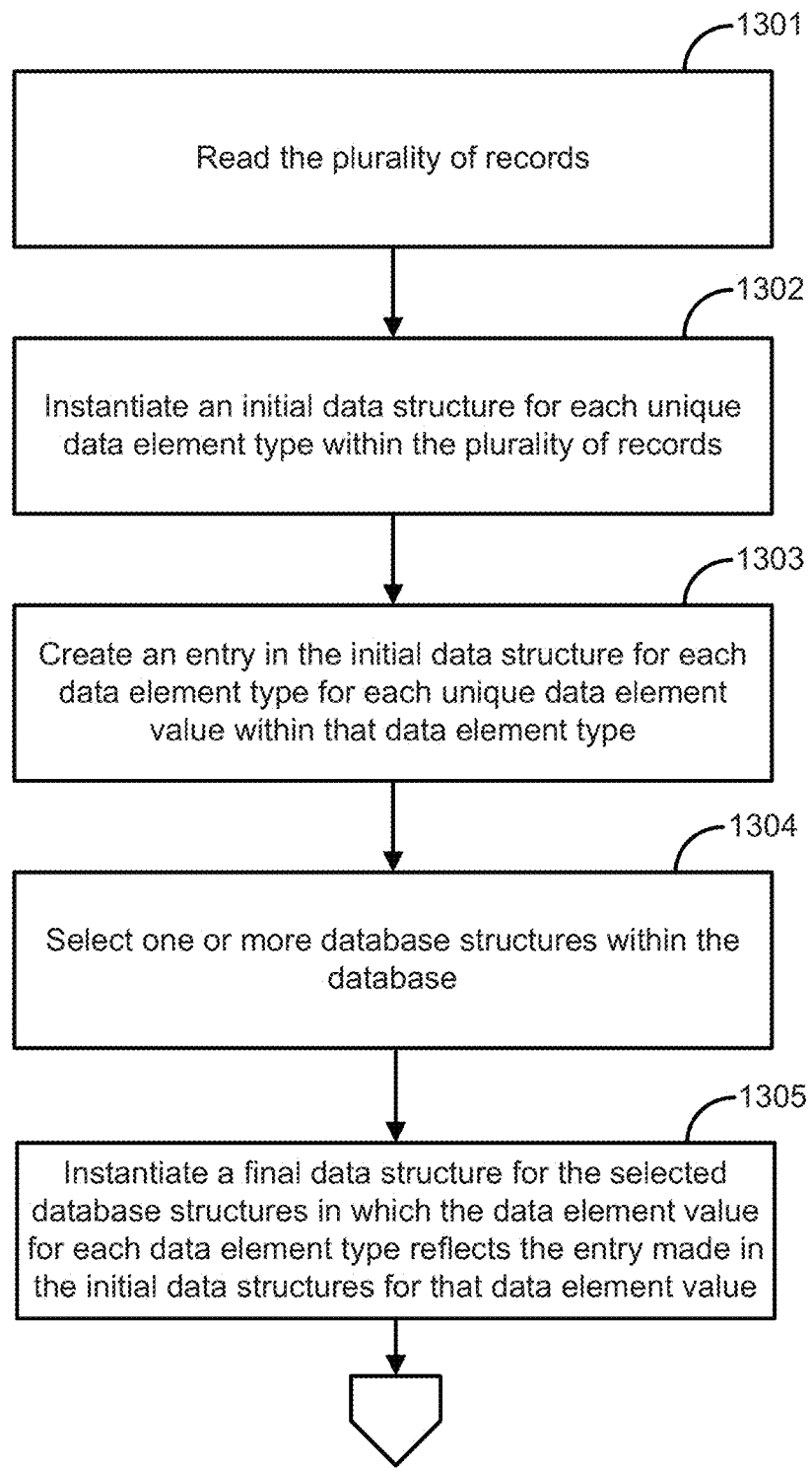
FIG. 13a illustrates the steps of a method according to one embodiment of the present disclosure.

In an aspect, illustrated in FIG. 13a, provided are methods for analyzing information within a database. The database can comprise one or more database structures which collectively contain a plurality of data records. Each record can have at least two data element types, with at least one of the data element types having a different data element value from the data element value for the corresponding data element type in at least one other record in the database. The methods can comprise reading the plurality of records at 1301, instantiating an initial data structure for each unique data element type within the plurality of records at 1302, creating an entry in the initial data structure for each data element type for each unique data element value within that data element type at 1303, selecting one or more database structures within the database at 1304, and instantiating a final data structure for the selected database structures in which the data element value for each data element type reflects the entry made in the initial data structures for that data element value at 1305.

Figure 13B:
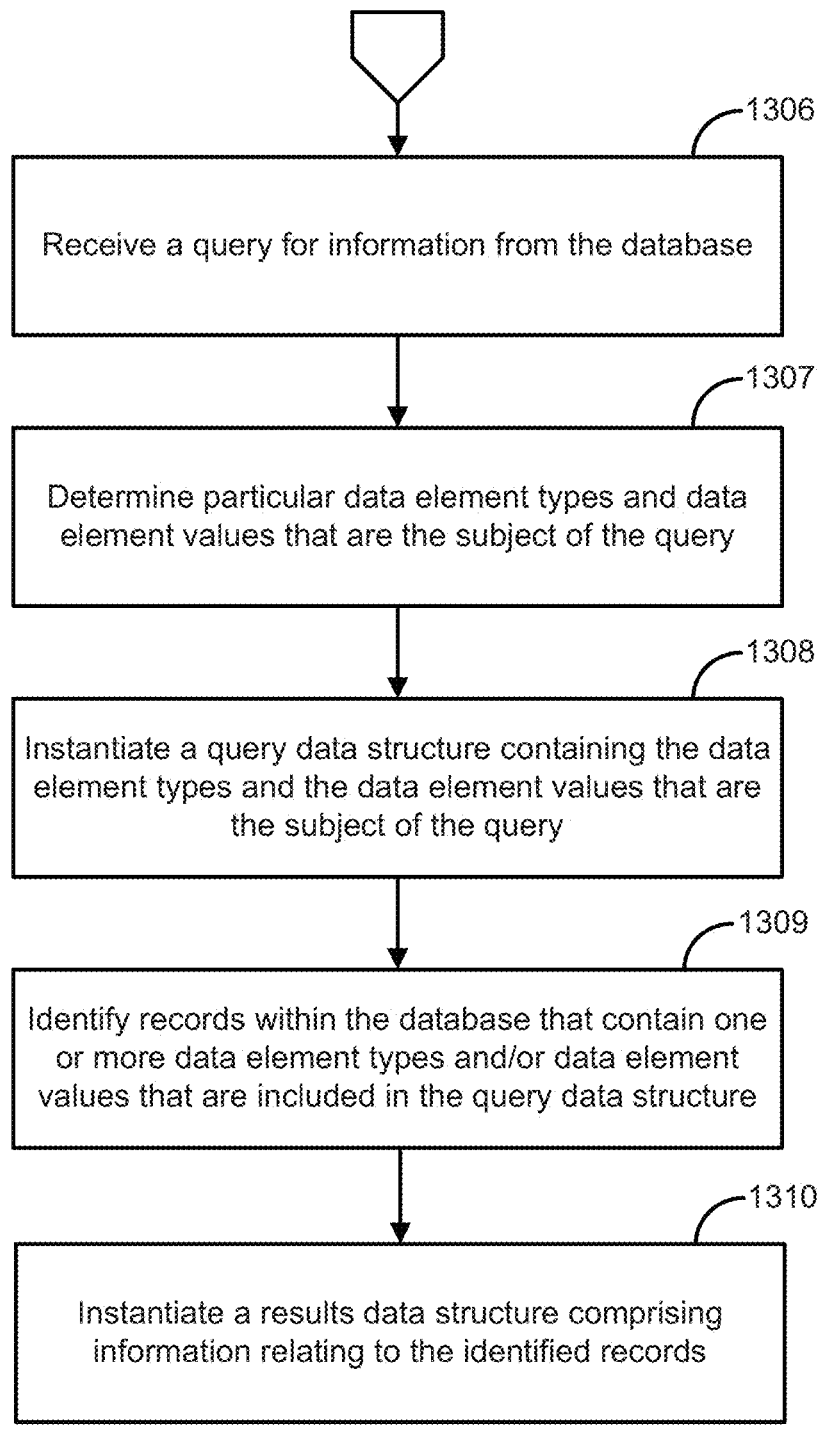
FIG. 13b illustrates the steps of a method according to one embodiment of the present disclosure.

In an aspect, illustrated in FIG. 13b, the methods can further comprise, receiving a query for information from the database at 1306, determining particular data element types and data element values that are the subject of the query at 1307, instantiating a query data structure containing the data element types and the data element values that are the subject of the query at 1308, identifying records within the database that contain one or more data element types and/or data element values that are included in the query data structure at 1309, and instantiating a results data structure comprising information relating to the identified records at 1310. Instantiating a query data structure can comprise using one or more values that reflect the entry made in the initial data structures for the data element. Instantiating a results data structure comprising information relating to the identified records can comprise indicating in the information whether or not the data element types and data element values of the identified records were included in the query data structure.

The methods can further comprise assigning a unique code, which code is of a type that can be used to facilitate computer processing, to each unique data element value within each data element type, wherein the entries in the initial data structures and the query data structure for the data element values are their assigned code instead of the actual data element values. The methods can further comprise associating a unique identifier to each of the initial, final, query and results data structures, and storing in memory the initial, final, query and results data structures along with their respective unique identifier.

The methods can further comprise displaying one or more of the data element values in a manner that indicates whether or not the data element values were included in the query data structure. The methods can further comprise counting the frequency of occurrence of each of the data element values included in the results data structure, and using the results of such counts to prioritize such data element values. The methods can further comprise sorting the displayed data element values included in the results data structure by the order of their frequency of occurrence. The methods can further comprise utilizing the number of occurrences to provide suggestions for the values for alternative queries of the database. The methods can further comprise counting the number of unique data element values included in the results data structure and utilizing such count to further analyze the information contained the database. The methods can further comprise counting the number of records containing one or more of the data element values included in the results data structure and utilizing such count to further analyze the information contained the database. The methods can further comprise counting the number of records that do not contain one or more of the data element values included in the results data structure and utilizing such count to further analyze the information contained the database.

The methods can further comprise using values in the initial database structures to suggest values for the query criteria during the entry of values for queries of the database, thereby enabling the user to accept such suggested values without actually entering the full query values. The methods can further comprise using values in the initial database structures to determine whether the values being entered for a query are either data element types or data element values and thereby afford searches of the database without the specification of whether the entered query values are data element types or data element values.

Figure 14:
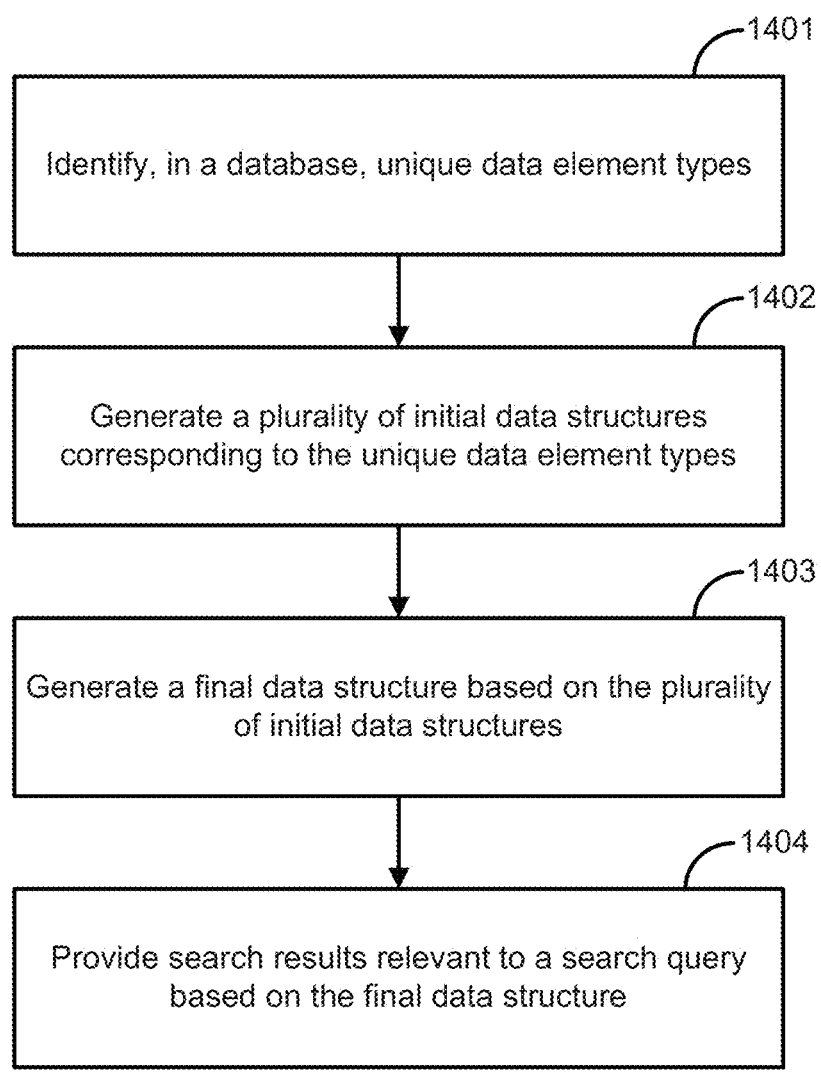
FIG. 14 illustrates the steps of a method according to another embodiment of the present disclosure.

In an aspect, illustrated in FIG. 14, provided are methods for analyzing information, comprising identifying, in a database, unique data element types at 1401, generating a plurality of initial data structures corresponding to the unique data element types at 1402, wherein the plurality of initial data structures comprise unique data elements associated with the corresponding unique data element type, generating a final data structure based on the plurality of initial data structures at 1403, wherein the final data structure is a non-redundant combination of the plurality of initial data structures, and providing search results relevant to a search query based on the final data structure at 1404.

In an aspect, generating the final data structure based on the plurality of initial data structures can comprise generating binary codes for corresponding unique data elements. Generating the final data structure based on the plurality of initial data structures can comprise combining at least two of the plurality initial data structures. Combining at least two of the plurality of initial data structures can comprise resolving at least one of data element dependency and data element redundancy between the at least two of the plurality of initial data structures.

Figure 15:
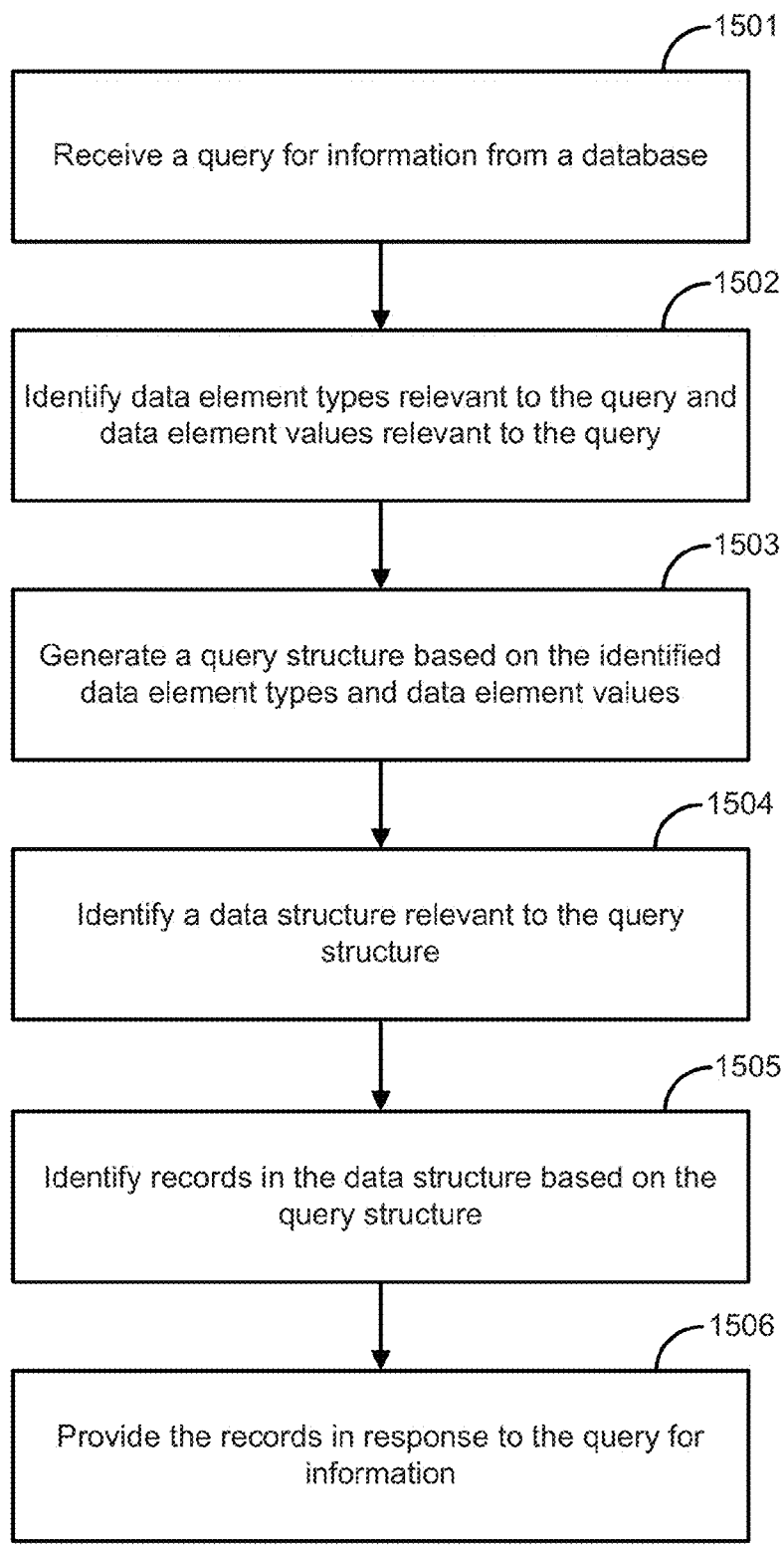
FIG. 15 illustrates the steps of a method according to one embodiment of the present disclosure.

In a further aspect, illustrated in FIG. 15, provided are methods, comprising receiving a query for information from a database at 1501, identifying data element types relevant to the query and data element values relevant to the query at 1502, generating a query structure based on the identified data element types and data element values at 1503, identifying a data structure relevant to the query structure at 1504, wherein the data structure comprises non-redundant data element values from the database, identifying records in the data structure based on the query structure at 1505, and providing the records in response to the query for information at 1506.

In an aspect, identifying the data structure relevant to the query structure can comprise identifying a data structure comprising the greatest number of identified data element types relevant to the query. Identifying records in the data structure based on the query structure can comprise identifying records associated with at least one of the data element types relevant to the query and the data element values relevant to the query. Providing the records in response to the query can comprise displaying at least one of unique data element types, unique data element values, and a count of the number the unique data element values.

In an aspect, one or more database snapshots can comprise the information needed to render images such as visualization hypercubes or other visualizations or portions thereof. In another aspect, the one or more database snapshots can comprise the underlying vectors representing the data states represented in the snapshot. Accordingly, snapshots using the teachings of the present disclosure are not just graphic files but rather dynamic displays of data states and visualizations that can be accessed and modified by the user. In an aspect, users of snapshots generated according to the present disclosure can, for example, convert bar charts into scatterplots, change labels and axis parameters, and make other changes to the snapshots. Accordingly, snapshots made according to the teachings of the present disclosure can be dynamic. The systems and methods of the present disclosure facilitate the capture of not only an image of a visualization but rather the initial structures, vectors and hypercubes that lead to such visualization. This can be accomplished through snapshots of one or more of the objects of the visualization. The snapshots can reflect the data state when taken. However, since the snapshots also include the applicable structures, vectors and hypercubes, the snapshots are dynamic and the user can change what is being displayed when a particular snapshot is recalled. The user can drill down and find, as well as alter, the data or visualization state of the snapshot. The snapshot can contain information defining how a user can manipulate and interact with the snapshot, applicable structures, vectors and hypercubes.

Figure 16:
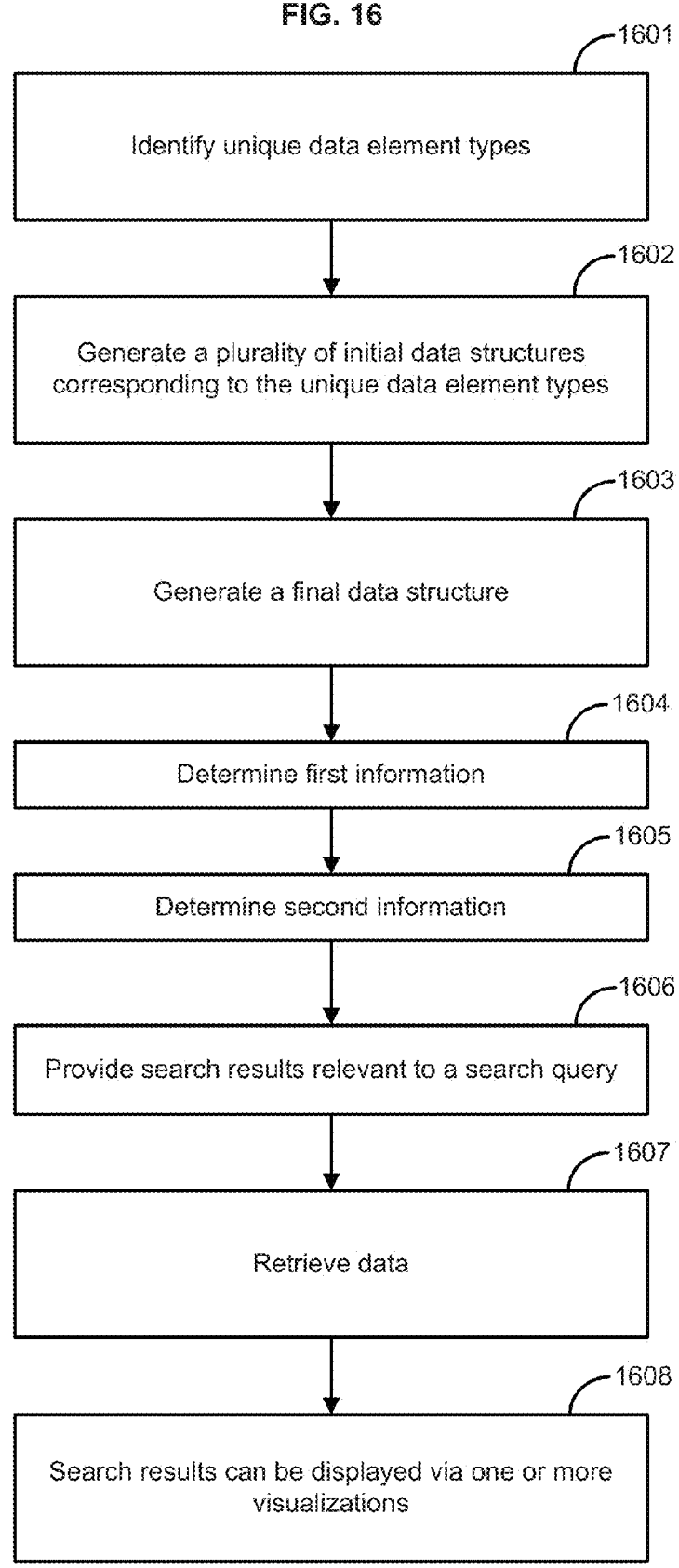
FIG. 16 illustrates the steps of a method according to one embodiment of the present disclosure.

FIG. 16 illustrates a method for analyzing information within a database. In an aspect, the database can comprise one or more database structures, which can collectively contain a plurality of data records. As an example, one or more of the data records can comprise one or more data element types. As a further example, at least one of the data element types can have a different data element value from the data element value for the corresponding data element type in at least one other record in the database. In another aspect, the database can comprise one or more query data structures which can comprise the data element types and the database element values and the functions that can be the subject of a query. In a further aspect, the database can comprise one or more results data structures which can comprise information relating to one or more identified records. Such information can include whether or not the data element types and data element values of the one or more identified records were included in a query data structure. In yet another aspect, the database can comprise one or more visualizations of at least some of the information in the results data structure.

In a further aspect, illustrated in FIG. 16, provided are methods, comprising identifying, in a database, unique data element types at 1601, generating a plurality of initial data structures corresponding to the unique data element types at 1602, wherein the plurality of initial data structures comprise representations of unique data elements associated with the corresponding unique data element type, generating a final data structure based on one or more of the records, at 1603, wherein the final data structure can be based upon the data element values included in one or more of the records and the data element values represented in the plurality of initial data structures. At 1604, first information can be determined. First information can relate to first data to be retrieved from the final data structure. The first information can comprise identifying information relating to the location and/or specification of the first data. The first information can be located within a stored data structure such as the final data structure. At 1605, second information can be determined. The second information can relate to second data to be retrieved from a source external to the final data structure, the second information can comprise identifying information relating to the location and specification of the second data. At 1606, search results can be provide. The search results can be relevant to a search query based on the first information and/or the second information. At 1607, data (e.g., the second data) can be retrieved (e.g., from the database being analyzed or another source/database). At 1608, the search results can be displayed via one or more visualizations. Such search results can include the retrieved data.

In an aspect, generating the final data structure based on the plurality of initial data structures can comprise generating binary codes for corresponding unique data elements. Generating the final data structure based on the plurality of initial data structures can comprise combining at least two of the plurality initial data structures. Combining at least two of the plurality of initial data structures can comprise resolving at least one of data element dependency and data element redundancy between the at least two of the plurality of initial data structures.

Figure 17:
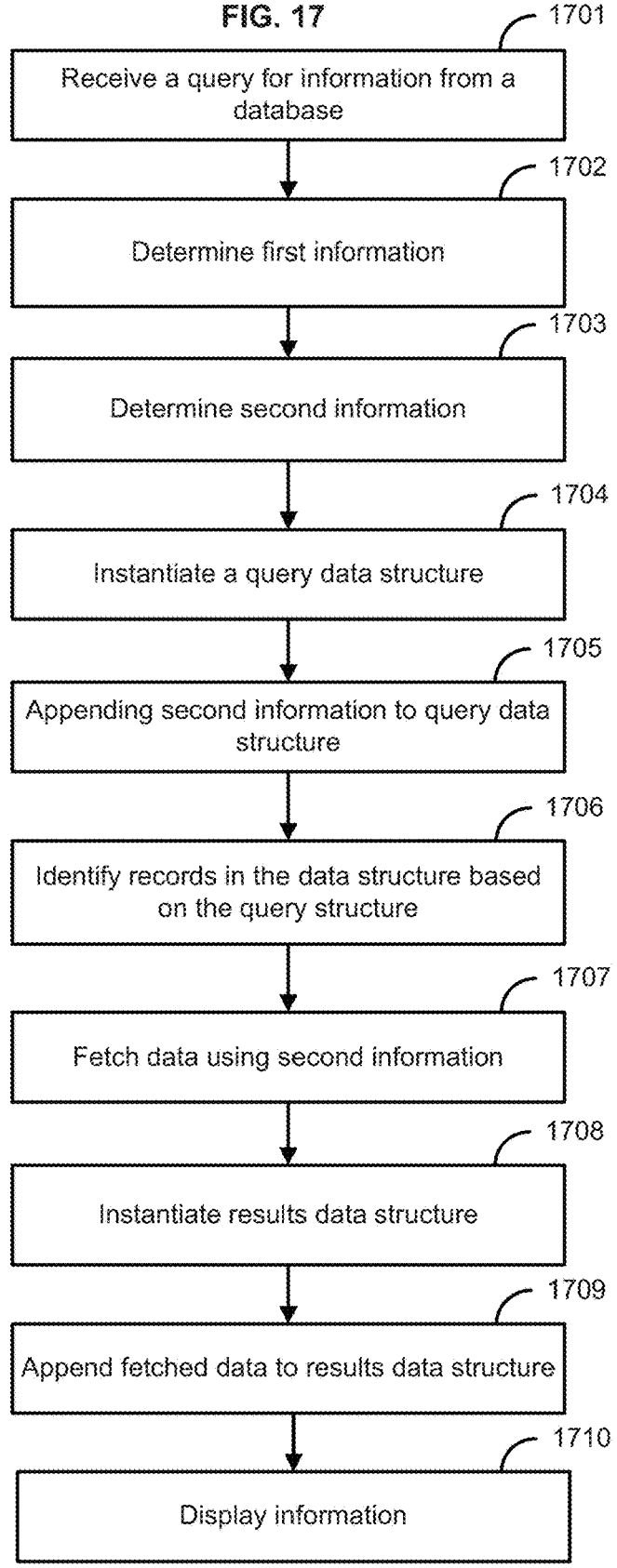
FIG. 17 illustrates the steps of a method according to one embodiment of the present disclosure.

In an aspect, methods are disclosed for analyzing information within a database that comprises one or more database structures which collectively contain a plurality of records, with each record having at least two data element types, and with at least one of the data element types having a different data element value from the data element value for the corresponding data element type in at least one other record in the database. In an aspect, methods can be characterized by one or more of the steps illustrated in FIGS. 13*a* and 13*b*. In another aspect, as illustrated in FIG. 17, methods can comprise, receiving a query for information from the database at 1701, determining first information comprising particular data element types and data element values that are the subject of the query at 1702, determining second information relating to data to be fetched from a source external to the final data structure, wherein the second information comprises identifying information relating to the location and specification of the data to be fetched at 1703, instantiating a query data structure containing the first information at 1704, appending the second information to the query data structure at 1705, identifying the records within the database that contain one or more database element types and/or database element values that are included in the query data structure at 1706, fetching data using the second information at 1707, instantiating and storing in memory a results data structure containing information relating to the identified records including whether or not the database element types and database element values of the identified records are included in the query data structure at 1708, and appending the fetched data to the results data structure at 1709. At 1710, information from the results data structure can be displayed with the appended fetched data in one or more visualizations. The visualization can be saved. In an aspect, the visualization can contain information from the results data structure with the appended fetched data.

Instantiating a query data structure can comprise using one or more values that reflect the entry made in the initial data structures for the data element. Instantiating a results data structure comprising information relating to the identified records can comprise indicating in the information whether or not the data element types and data element values of the identified records were included in the query data structure. Fetching the data can comprises fetching the data from the database being analyzed and/or fetching the data comprises fetching the data from a specified external source.

Figure 18:
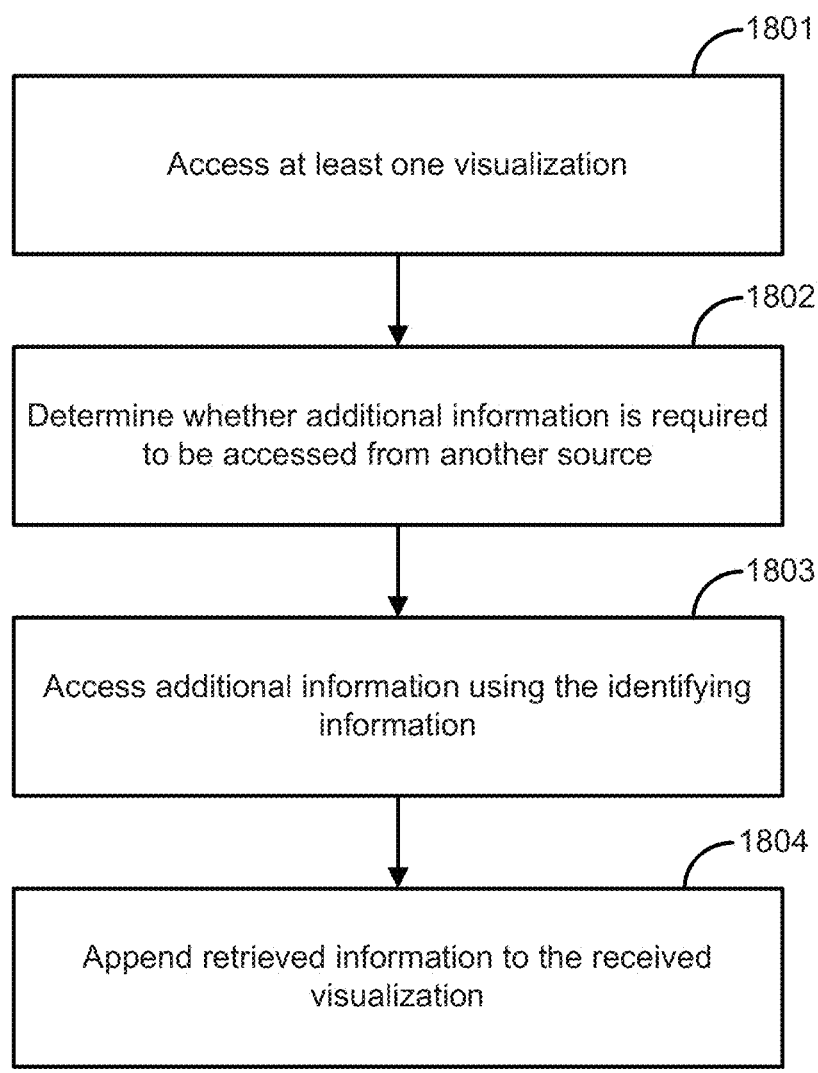
FIG. 18 illustrates the steps of a method according to one embodiment of the present disclosure.

FIG. 18 illustrates a method for analyzing information within a database. In an aspect, the database can comprise one or more database structures, which can collectively contain a plurality of data records. As an example, one or more of the data records can comprise one or more data element types. As a further example, at least one of the data element types can have a different data element value from the data element value for the corresponding data element type in at least one other record in the database. In another aspect, the database can comprise one or more query data structures which can comprise the data element types and the database element values and the functions that can be the subject of a query. In a further aspect, the database can comprise one or more results data structures which can comprise information relating to one or more identified records. Such information can include whether or not the data element types and data element values of the one or more identified records were included in a query data structure. In yet another aspect, the database can comprise one or more visualizations of at least some of the information in the results data structure.

At step 1801, at least one of the visualizations can be received or accessed (e.g., recalled). In an aspect, the received visualization can include information relating to a results data structure associated with the received visualization. At step 1802, a determination can be made whether additional information is required to be accessed or retrieved (e.g., fetched) from another source. If additional information is required, identifying information for fetching the additional information from the other source can be determined. At step 1803, the additional information can be accessed or retrieved using the identifying information. At step 1804, retrieved information can be appended to the received visualization.

Furthermore since each object within a visualization or document can be associated with its own hypercube, individual elements (or collection of elements) contained within any snapshot can be extracted and/or utilized as part of a report or presentation. The extracted elements, for example recalled vectors and hypercubes, remain dynamic and can be modified by the users. The generated reports can be converted into static presentation such as a PowerPoint™-like presentations with added narrative or graphic treatment. Accordingly, using the teachings of present disclosure, snapshots can be shared by other users of products in their dynamic, modifiable state and/or can be turned into static representations and included with traditional static reports and presentations.

Figure 19:
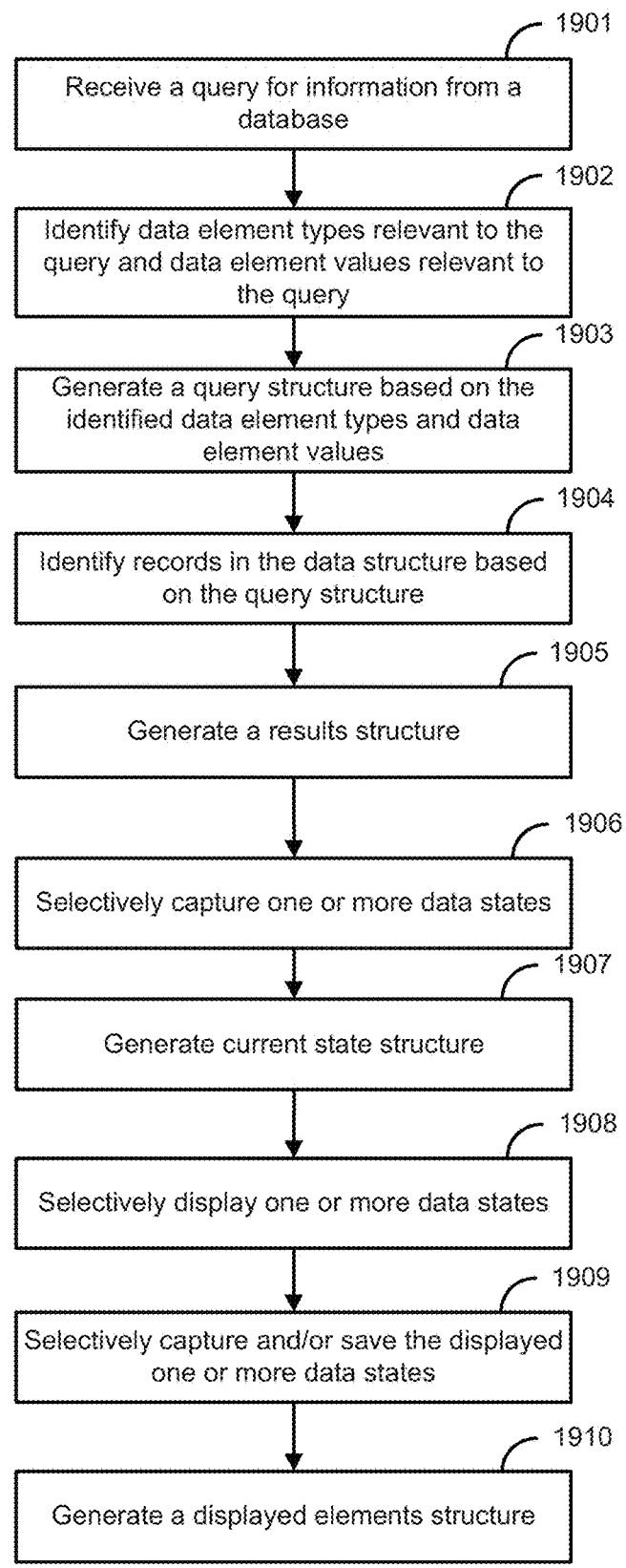
FIG. 19 illustrates the steps of a method according to one embodiment of the present disclosure.

In a further aspect, illustrated in FIG. 19, provided are methods, comprising receiving a query for information from a database at 1901, identifying data element types relevant to the query and data element values relevant to the query at 1902, generating a query structure based on the identified data element types and data element values at 1903, identifying records in the data structure based on the query structure at 1904, generating a results structure, at 1905, selectively capturing one or more data states based upon the query structure and results structure, wherein the one or more data states reflect a current data state at 1906, and generating a current state structure for the captured one or more data states at 1907. At 1908, one or more data states represented by the query structure and results structure can be selectively displayed. At 1909, the displayed one or more data states can be selectively captured and/or saved. At 1910, a displayed elements structure can be generated for the captured displayed data states for subsequent retrieval.

In an aspect, identifying the data structure relevant to the query structure can comprise identifying a data structure comprising the greatest number of identified data element types relevant to the query. Identifying records in the data structure based on the query structure can comprise identifying records associated with at least one of the data element types relevant to the query and the data element values relevant to the query. In an aspect, one or more of the query structure and the results structure can represent a data state. Providing the records in response to the query can comprise displaying at least one of unique data element types, unique data element values, and a count of the number the unique data element values.

In an aspect, previously stored visualizations or data states can be modified. In another aspect, the modification can be previewed without saving the changes or otherwise altering the originally stored data states or visualizations. Since multiple data states and/or visualizations can be separately stored and recalled, the user can decide whether to discard any changes made to these data states or visualizations, or to save the changes made to the data states and visualizations. The modifications can be saved to one or more of the original and new data state or visualization. Depending upon the selections exercised, new or modified hypercubes or vectors can be saved along with the unique associated identifying information. While the effect of these changes can be viewed as part of a new data state or visualization, they can easily be undone without saving the new resultant data state or visualization. In practice the preview mode can be set up with scripting provided as part of an embodiment of the present disclosure. For example, a command could be issued to "Setup Preview" which would take a snapshot of the then current data state and/or visualization, and store the snapshot along with the identifying information need to recall it. Any changes which are now made will not be reflected in the stored state that was called prior to making any changes, although they can be viewed by the user as modified. Another command, for example "AcceptPreview" can be used to save the current state, while a command such as "AbortPreview" can be used to undo the changes without saving the state. Similar command syntax can be used to specify whether the modifications are save as a new state or visualization, or whether the state or visualization that was called is modified and then saved. It should be recognize that other techniques are available to determine whether a given state is saved or discarded, such as dragging and dropping. These other techniques are considered to be part of the present invention.

Figure 20:
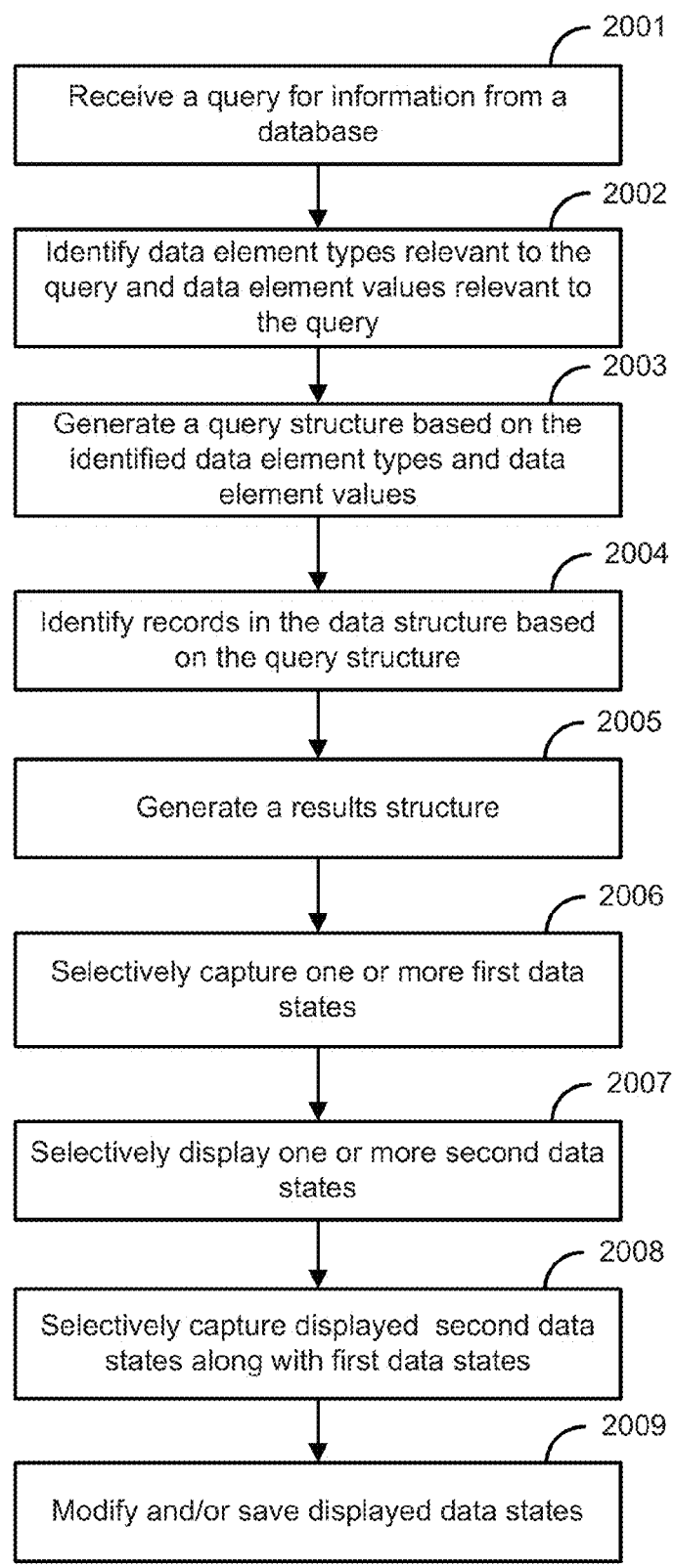
FIG. 20 illustrates the steps of a method according to one embodiment of the present disclosure.

In an aspect, methods are disclosed for analyzing information within a database that comprises one or more database structures which collectively contain a plurality of records, with each record having at least two data element types, and with at least one of the data element types having a different data element value from the data element value for the corresponding data element type in at least one other record in the database. In an aspect, methods can be characterized by one or more of the steps illustrated in FIGS. 13*a* and 13*b*. In a further aspect, illustrated in FIG. 20, provided are methods, comprising receiving a query for information from a database at 2001, identifying data element types relevant to the query and data element values relevant to the query at 2002, generating a query structure based on the identified data element types and data element values at 2003, identifying records in the data structure based on the query structure at 2004, and generating a results structure, at 2005, the results structure containing information relating to the identified records selectively capturing one or more elements of the query structure and results structure reflecting a current data state. At 2006, one or more first data states can be captured based upon the query structure and results structure, wherein the one or more first data states are an indicia of a current data state. At 2007, one or more second data states of the query structure, the results structure, or both can be displayed. At 2008, the displayed second data states can be captured along with the first data states that are the indicia of the current state. At 2009, the displayed data states can be modified. In an aspect, the modified displayed data states can be selectively captured or discarded (e.g., modifications can be previewed and saved or discarded).

In an aspect, identifying the data structure relevant to the query structure can comprise identifying a data structure comprising the greatest number of identified data element types relevant to the query. Identifying records in the data structure based on the query structure can comprise identifying records associated with at least one of the data element types relevant to the query and the data element values relevant to the query. Providing the records in response to the query can comprise displaying at least one of unique data element types, unique data element values, and a count of the number the unique data element values.

In an aspect, information from the database can be added to a data state or visualization that is not currently included in the recalled data state or visualization. This added information can include an additional field or even a new table or other database structure. Typically this information can be called or extracted from the database information that already exists but is not part of the present data state or visualization. Again the user can determine whether the changes made are saved as new states or visualizations or as modifications to the called data state or visualization, or discarded.

In another aspect, data that is external to (e.g., not part of) the database and/or visualization can be retrieved. This can be done, for example, by using SQL commands or statements. This aspect is not, however, limited to SQL syntax, and other syntax could also be used. This external data can be called and used as part of a new data state or visualization, without changing the underlying database or the data structures, or the vectors associated therewith. The fetched data can be displayed along with data from the database in any visualization of the data. This ability leverages the other advantages of the present disclosure. In particular it provides the ability to fetch external data when the available memory is not sufficient or when data needs to be included from another database. Depending upon the exact commands or statements utilized to fetch the external data, the fetched data can be joined with the underlying initial or final data structures, or the vectors associated therewith for the stored database. When joined the use can navigate the fetched data in the same manner as the stored data, and such fetch data can be included in visualizations of the data, all in a manner that is transparent to the user.

In an aspect, information contained in a data state or visualization can be selectively included, discarded, and/or stored. The new or modified information can be previewed, discarded, and/or saved (e.g., saved to the original data state or visualization or a new state or visualization). Utilizing these teachings, the ability to add information to a data state or visualization and link that information to one or more other data states or visualizations is possible. With these linked data states or visualizations changes that are made to one, can be carried over to the other linked data states or visualizations. The type or degree of linkage can be determined. For example the types of changes that can be made by various types or identity of users can be controlled. Master data states and/or visualizations can be implemented such that while changes in the master data state or visualization will be carried over to the other linked states or visualization, the reverse is not true. Similarly one or more of the data states or visualization can be identified as being a master data state or visualization. Other types of linkage and linkage controls can be implemented and are contemplated by the present disclosure, including but not limited to controlling such linkage by geographic location, time, type of license, and so forth.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A system for analyzing information, comprising: a first database comprising a plurality of records having one or more data element types and one or more data element values; and a computing device in communication with the database, the computing device comprising system memory and configured to:
   identify, in the database, unique data element types; generate a plurality of initial data structure corresponding to the unique data element types, wherein the plurality of initial data structures comprise representations of unique data element values associated with the corresponding unique data element type;
   generate a final data structure based on one or more records of the plurality of records, wherein the final data structure is based upon the data element values included in the one or more records and the data element values represented in the plurality of initial data structures, wherein the final data structure comprises a multidimensional hypercube data structure;
   store the final data structure in a portion of the system memory of the computing device; determine first information relating to first data to be retrieved from the final data structure;
   determine second information relating to second data to be retrieved from a second database external to the system memory, wherein the second information comprises identifying information relating to the location and specification of the second data;
   joining the second data to the final data structure to generate an updated data state without modifying the database; and provide a visualization comprising one or more graphical objects representing the updated data state.

2. A method for analyzing information within a first database that comprises one or more database structures which collectively contain a plurality of records, with each record having at least two data element types, and with at least one of the data element types having a different data element value from the data element value for the corresponding data element type in at least one other record in the first database; the method characterized by the steps of: reading, by a first device, the plurality of records; instantiating, by the first device, an initial data structure for each unique data element type within the plurality of records; creating an entry in the initial data structure for each data element type for each unique data element value within that data element type; selecting one or more database structures within the first database; instantiating, by the first device, a final data structure for the selected database structures in which the data element value for each data element type reflects the entry made in the initial data structures for that data element value, wherein the final data structure comprises a multidimensional hypercube data structure;
storing the final data structure in a portion of system memory of the first device; receiving a query for information from the first database; determining first information comprising particular data element types and data element values that are the subject of the query; determining second information relating to data to be fetched from a second database external to the system memory, wherein the second information comprises identifying information relating to the location and specification of the data to be fetched; instantiating a query data structure containing the first information; appending the second information to the query data structure; identifying the records within the first database that contain one or more database element types, database element values that are included in the query data structure, or a combination thereof, fetching the data to be fetched using the second information; instantiating and storing in memory a results data structure containing information relating to the identified records including whether or not the database element types and database element values of the identified records are included in the query data structure; joining the fetched data to the final data structure to generate an updated data state without modifying the first database; and providing a visualization comprising one or more data graphical objects representing the updated data state.

3. A method for analyzing information within a database that comprises one or more database structures which collectively contain a plurality of records, with each record having at least two data element types, and with at least one of the data element types having a different data element value from the data element value for the corresponding data element type in at least one other record in the database, the method characterized by the steps of: reading the plurality of records; instantiating an initial data structure for each unique data element type within the plurality of records; creating an entry in the initial data structure for each data element type for each unique data element value within that data element type; selecting one or more database structures within the database; instantiating a final data structure for the selected database structures in which the data element value for each data element type reflects the entry made in the initial data structures for that data element value, wherein the final data structure comprises a multidimensional hypercube data structure; receiving a query for information from the database; instantiating and storing in memory a query data structure containing the database element types, the database element values and the functions that are the subject of the query, using the entries stored in the initial data structures for the data element values of the query; identifying data within the database that contain one or more database element types and/or database element values that are included in the query data structure; instantiating and storing in memory a results data structure containing information relating to the identified one or more records including the database element types and database element values of the identified data; selectively capturing one or more first data states represented by the query data structure and results data structure, wherein the one or more first data states are an indicia of the current data state, wherein selectively capturing comprises storing, for later retrieval, a dynamic snapshot comprising 1) the one or more data states at the time of the capturing and 2) a visualization comprising one or more graphical objects representing the data, and wherein the one or more graphical objects comprise one or more of a graph or a chart, and wherein a user can modify how the data is displayed by the visualization by later interacting with the one or more graphical objects; selectively displaying one or more second data states represented by the query data structure and results data structure; selectively capturing the displayed one or more second data states along with the one or more first data states; and modifying the displayed one or more second data states.

* * * * *